United States Patent [19]
Ban et al.

[11] Patent Number: 5,644,689
[45] Date of Patent: Jul. 1, 1997

[54] ARBITRARY VIEWPOINT THREE-DIMENSIONAL IMAGING METHOD USING COMPRESSED VOXEL DATA CONSTRUCTED BY A DIRECTED SEARCH OF VOXEL DATA REPRESENTING AN IMAGE OF AN OBJECT AND AN ARBITRARY VIEWPOINT

[75] Inventors: Hideyuki Ban, Kodaira; Ryuichi Suzuki, Kokubunji, both of Japan

[73] Assignee: Hitachi, Ltd., Tokyo, Japan

[21] Appl. No.: 1,389

[22] Filed: Jan. 6, 1993

[30] Foreign Application Priority Data

| Jan. 13, 1992 | [JP] | Japan | 4-003673 |
| May 6, 1992 | [JP] | Japan | 4-113344 |

[51] Int. Cl.$^6$ ............................................. G06T 17/20
[52] U.S. Cl. ............................................. 395/124
[58] Field of Search ................... 395/119, 120, 395/122, 123, 124, 126, 127, 136, 137, 138

[56] References Cited

U.S. PATENT DOCUMENTS

| 4,737,921 | 4/1988 | Goldwasser et al. | 395/121 |
| 4,791,583 | 12/1988 | Colburn | 395/120 |
| 4,797,836 | 1/1989 | Witek et al. | 395/136 X |
| 4,821,213 | 4/1989 | Cline et al. | 395/124 |
| 4,827,413 | 5/1989 | Baldwin et al. | 345/139 X |
| 4,868,748 | 9/1989 | Crawford et al. | 395/124 X |
| 4,879,668 | 11/1989 | Cline et al. | 395/124 |
| 4,922,915 | 5/1990 | Arnold et al. | 382/128 |
| 4,987,554 | 1/1991 | Kaufman | 395/141 X |
| 5,014,207 | 5/1991 | Lawton | 364/468 |
| 5,025,375 | 6/1991 | Sugawara | 382/239 |
| 5,038,302 | 8/1991 | Kaufman | 395/124 |
| 5,046,108 | 9/1991 | Inoue et al. | 395/126 X |
| 5,068,808 | 11/1991 | Wake | 395/119 |
| 5,086,495 | 2/1992 | Gray et al. | 395/124 X |
| 5,101,475 | 3/1992 | Kaufman et al. | 395/124 |

OTHER PUBLICATIONS

Frieder et al., Back to Front Display of Voxel Based Objects, IEEE Computer Graphics & Applications, Jan. 1985, pp. 52–60.

Foley et al., Computer Graphics: Principles and Practice, 1990, pp. 698–717.

Foley et al, Computer Graphics: Principles & Practice, 1990, pp. 213–217, 548–557, 668–680, 695–698, 751–753, 1062–1063.

Goldwasser et al, Techniques for the Rapid Display and Manipulation of 3–D Biomedical Data, Comp. Med. Imag. and Graphics, vol. 12, No. 1, 1988, pp. 1–24.

Srihari, Representation of Three Dimensional Digital Images, Computing Surveys, Dec. 1981, pp. 399–424.

Kaufman et al, Voxel–Based Processing, IEEE Computer Graphics and Applications, Nov. 1988, pp. 10–23.

Gargantini et al, Viewing Transformations of Voxel Based Objects via Linear Octrees, IEEE Computer Graphics and Applications, Oct. 1986, pp. 12–21.

Primary Examiner—Heather R. Herndon
Assistant Examiner—Anton W. Fetting
Attorney, Agent, or Firm—Antonelli, Terry, Stout & Kraus, LLP

[57] ABSTRACT

Original image coordinate data representing boundary positions of an object detected through the search of the object along predetermined multiple directions is produced in advance. A range image seen from a display plane is produced through the affine transformation process for the detected boundary positions and comparison and substitution processes for distances by means of a Z-buffer. A shading process is performed based on the range image, and the resulting object image is displayed on a CRT screen or the like. This method enables the transformation of voxel-wise original image data into original image coordinate data merely through the sequential access to the original image data, eliminating the need of intricate image processes such as tracking on the object surface, and is capable of displaying a three-dimensional image of the object quickly and also enhancing the picture quality of the displayed image.

1 Claim, 20 Drawing Sheets

U.S. PATENT DOCUMENTS

| | | | |
|---|---|---|---|
| 5,159,663 | 10/1992 | Wake | 395/122 |
| 5,187,660 | 2/1993 | Civanlar et al. | 395/119 X |
| 5,201,035 | 4/1993 | Stytz et al. | 395/163 |
| 5,212,480 | 5/1993 | Ferro | 364/434 X |
| 5,216,593 | 6/1993 | Dietrich et al. | 364/468 |
| 5,255,354 | 10/1993 | Mahoney | 395/133 |
| 5,325,472 | 6/1994 | Horiuchi et al. | 395/127 |
| 5,381,518 | 1/1995 | Drebin et al. | 395/124 |

FIG. 6B

| COMPRESSED COORDINATE DATA | STORE START POSITION | COORDINATE SUB-FIELD STORE ORDER (X AXIS) | NIMBER SUB-FIELD STORE ORDER | |
|---|---|---|---|---|
| | | | Y AXIS | Z AXIS |
| A [ - - - ] | 101 | ASCEND | FORWARD | FORWARD |
| A [ - - + ] | 102 | DESCEND | FORWARD | FORWARD |
| A [ - + - ] | 103 | ASCEND | REVERSE | FORWARD |
| A [ - + + ] | 104 | DESCEND | REVERSE | FORWARD |
| A [ + - - ] | 105 | ASCEND | FORWARD | REVERSE |
| A [ + - + ] | 106 | DESCEND | FORWARD | REVERSE |
| A [ + + - ] | 107 | ASCEND | REVERSE | REVERSE |
| A [ + + + ] | 108 | DESCEND | REVERSE | REVERSE |

FIG. 7A
FIG. 7B
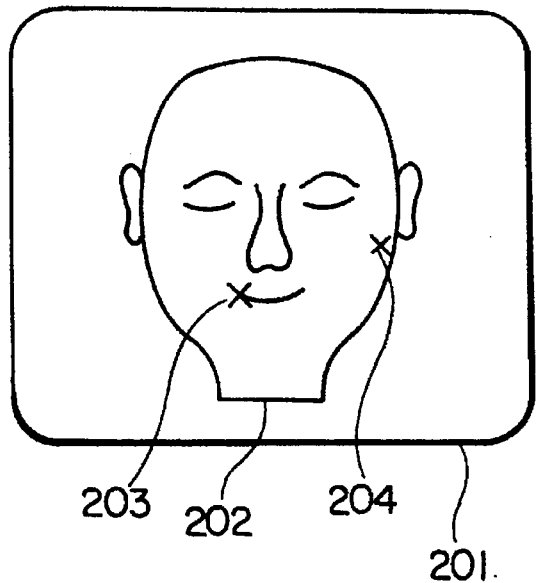
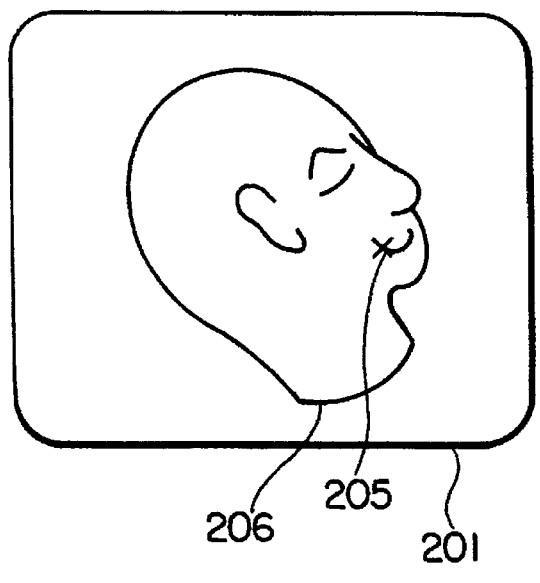

R : ROTATION TRANSFORMATION MATRIX

ARBITRARY VIEWPOINT THREE-DIMENSIONAL IMAGING METHOD USING COMPRESSED VOXEL DATA CONSTRUCTED BY A DIRECTED SEARCH OF VOXEL DATA REPRESENTING AN IMAGE OF AN OBJECT AND AN ARBITRARY VIEWPOINT

BACKGROUND OF THE INVENTION

This invention relates to a method of displaying a three-dimensional image of an object which is expressed in voxel-based representation, and to a method of manipulating a three-dimensional object image on the screen in displaying the object image.

Three-dimensional image data is given in the form of cubic picture elements in a three-dimensional space or a three-dimensional array (three-dimensional lattice) of gray values, for example. A cubic picture element or the element of a three-dimensional array is termed "voxel". Applications of the three-dimensional image display technique include the CT image analysis (medical and industrial), pathological specimen imaging, and variable-focus microscopic imaging.

A projection image of an object, which is provided in the form of voxel-wise three-dimensional image data, seen at an arbitrary viewing angle is displayed in the following procedure. First, a viewpoint is set at an arbitrary position in a three-dimensional space, and a plane on which the viewpoint is located is defined as a "display plane". Next, the coordinate system is transformed such that the direction normal to the display plane is parallel to the z axis. This coordinate transformation is carried out successively for coordinate values of voxels inside the object, and resulting z-axis values are written to a two-dimensional buffer which is different from the memory of the three-dimensional image data. This buffer is called "depth buffer" or "z-buffer". In writing z-axis values to the z-buffer, a newly written z-axis value is compared with stored values in the z-buffer (Z-axis values of voxels resulting from the coordinate transformation), and a z-axis value nearer to the viewpoint is rewritten to the image memory. This operation is repeated so that information of the voxels at the back of the object is removed (hidden surface removal). Eventually, z-axis values on the object surfaces which can be seen from the display plane are stored in the z-buffer. The z-axis values represent the distances from the display plane to the portions of the object, and accordingly a two-dimensional image in the z-buffer is called a "range image".

There has been a method of displaying a three-dimensional image of an object which is expressed in voxel-wise data, as described in the article of Technical Report of the Information Processing Society of Japan entitled "Graphics and CAD (computer aided design)", 43–4(1990), pp. 1–9, for example. This publication offers the application of the graphics technology to medical treatment, particularly surgical simulation. The method described in this report will be explained in brief. First, voxel-wise data of an object is transformed into the run-based expression. Next, the end points of the run are rendered the coordinate transformation so that three-dimensional line segments in the coordinate system which include the display plane are generated. Next, the Z axis values (distances) of the three-dimensional line segments measured from the display plane are selected in the z-buffer to thereby produce a range image on the display plane. Finally, a shading process is performed based on the range image and a complete three-dimensional image is displayed.

An object model created by a computer or the like is displayed as three-dimensional images seen from every direction and the features of the object are recognized. FIG. 8 shows an example of the procedure. A set of three-dimensional source image data 211 includes information on the object useful for display such as the location and shape of the object, and it is expressed in terms of the three-dimensional coordinate system (having the x, y and z axes) for example. Initially, the object is rotated around an intended rotation axis (a coordinate axis in general) at an intended angle (step 212). The rotated object image is projected onto a predetermined plane (i.e., display plane) (step 213), the projected image is rendered the hidden surface removal and shading processes (step 214), and a complete image is displayed on the screen (step 215).

Conventionally, a rotational angle of the object is specified through direct numeric input on the keyboard, or through the entry of a mark on the form chart as described in the article of the "1991 Spring National Convention Record" of the Institute of Electronics, Information and Communication Engineers, part 7, pp. 407–408, for example.

SUMMARY OF THE INVENTION

The conventional image display method necessitates the generation of three-dimensional line segments and the comparison and substitution of distances at each point on the line segments. On this account, it takes a considerable amount of time and labor and it is very difficult to perform the three-dimensional display operation quickly.

An object of the present invention is to overcome the foregoing prior art deficiency and provide an image display method which is capable of reducing the number of times of data access and computation in displaying an image of voxel-wise object data and suitable for the speed-up of the three-dimensional display operation and the enhancement of the picture quality.

In the conventional image manipulation method, the operator is required to numerically specify a rotational angle, and therefore it is difficult for the operator to intuitively anticipate a three-dimensional image which will be displayed as a result of the command input. In addition, a command is entered to the screen position that is different from the position of the three-dimensional image, and therefore it is difficult for the operator to take an input action while viewing the image. On this account, it is very difficult to accomplish a user interface which allows the operator to rotate the object image on the screen with the impression similar to rotating the actual object in real space.

A secondary object of the present invention is to overcome the above-mentioned prior art deficiency and provide an image manipulation method which enables the operator to command the rotation of a three-dimensional object image on the screen based on the user interface which allows the operator to rotate the object image with the impression similar to rotating the actual object in the real space.

In order to achieve the first objective, the image display method based on this invention is designed to produce in advance a set of original image coordinate data which represents the boundary positions of the object detected through the search of the voxel-wise object data along predetermined multiple directions and project a three-dimensional object image on the display plane based on the boundary positions represented by the original image coordinate data. In operation, the boundary position of original image coordinate data are rendered the coordinate transformation process so that they are converted to coordinate values on the display plane and distances from the display plane, and thereafter a range image seen from an arbitrary viewpoint is produced from the converted boundary positions by using a z-buffer, and finally a three-dimensional image which is shaded based on the range image is displayed. The coordinate transformation process is implemented by using the affine transformation process for example. The original image coordinate data, which represents the boundary positions of the object when searched from outside to inside of the object or from inside to outside of the object along predetermined directions, is stored, and the image is projected to the display plane through the selection of boundary positions depending on the position of the viewpoint. In this case, the original image coordinate data is read out of the memory by starting at the boundary position farthest from the position of the viewpoint.

In generating the original image coordinate data, compressed coordinate data of the original image is produced through an information compression process including the removal of boundary positions that are duplicate in the original image coordinate data selected depending on the position of the viewpoint, and a range image is produced from the compressed coordinate data. The compressed coordinate data is read out by starting at the boundary position farthest from the position of the viewpoint, and the boundary positions are written to the z-buffer by starting at the boundary position farthest from the position of the viewpoint.

The image display method based on this invention is designed to produce in advance a set of compressed coordinate data of original image which represent the boundary positions of voxel-wise object data different in the connectivity with neighboring voxels and project a three-dimensional object image on the display plane based on the boundary positions represented by the compressed coordinate data. The compressed coordinate data is read out by starting at the boundary position farthest from the position of the viewpoint, and the boundary positions are written to the z-buffer by starting at the boundary position farthest from the position of the viewpoint.

According to this invention, voxel-wise object data is first rendered the affine transformation process for the object boundary positions, and next a range image seen from an arbitrary viewpoint is produced by using the z-buffer, and finally a three-dimensional image which is shaded based on the range image is displayed. In this case, a set of original image coordinate data which represent the boundary positions of the object detected through the search of the voxel-wise object data along predetermined multiple directions is produced in advance, and the range image is produced from the original image coordinate data. Accordingly, the range image seen from an arbitrary viewpoint can be created merely through the affine transformation for the original image coordinate data of boundary positions and the comparison and substitution of distances by use of the z-buffer. As a result, the number of data accesses and computations can be reduced, and the quick three-dimensional display operation is made possible.

Through the use of the connectivity of many neighboring voxels, such as the 18-connectivity and 26-connectivity, displayed screen is reflected by data in the vicinity to the boundary positions in attention, and the displayed image can have an enhanced picture quality.

According to this invention for displaying a three-dimensional image of voxel-wise object data, a set of original image coordinate data which represents boundary positions of the object detected through the search of the object along predetermined multiple directions is produced in advance and a range image seen from an arbitrary viewpoint is produced from the original image coordinate data. Accordingly, a three-dimensional image of the object can be displayed merely through the affine transformation for the boundary positions represented by the original image coordinate data and the comparison and substitution processes for the distances in the z-buffer. As a result, the number of data accesses and computation can be reduced, and the quick three-dimensional display operation is made possible.

In addition, the transformation process to produce original image coordinate data can be implemented merely through the sequential access to the voxel-wise original image data along the predetermined directions, and intricate image processes such as tracking on the object surface is unneeded, whereby the three-dimensional display based on the coordinates of boundaries is made possible. In addition, it is possible to enhance the picture quality of the displayed image.

In order to achieve the above-mentioned second objective, the image manipulation method based on this invention is designed to rotate a displayed object image by allowing the operator to make direct access to the image or direct manipulation of the image. Specifically, the operator enters base coordinates (a base position) which are the reference of operation and target coordinates (a target position) on the screen coordinate system, and the object image is rotated such that the portion of the object image located at the base coordinates is moved to the target coordinates. In operation, the operator first enters base coordinateses in the screen coordinate system and thereafter enters target coordinates successively in the screen coordinate system, and then the object image is rotated in steps such that the portion located at the base coordinates is moved to the target coordinates successively. This method enables the operator to pick up coordinates on the screen through direct access or point to the screen section where the object image is displayed.

For the rotation of the object image, a coordinate transformation matrix is generated by using base coordinate transformation means which transforms base coordinates into three-dimensional base coordinates that are three-dimensional coordinates of the portion displayed at the position of the base coordinates, target coordinate transformation means which transforms target coordinates to three-dimensional target coordinates that are three-dimensional coordinates of the portion when the object image is rotated so that the portion is displayed at a position of the target coordinates, and rotation transformation matrix generation means which generates a coordinate transformation matrix for transforming the three-dimensional base coordinates to the three-dimensional target coordinates.

The base coordinate transformation means produces the three-dimensional base coordinates from the base coordinates and the depth value of the position of the base coordinates stored in the z-buffer when carrying out the hidden surface removal based on the z-buffer algorithm. The rotation transformation matrix generation means produces a matrix of coordinate transformation which rotates the object image directly from the position of the portion before the rotation when the object image is initially displayed to the target position, so that the resulting matrix is used as a coordinate transformation matrix for transforming the three-dimensional base coordinates to the three-dimensional target coordinates. The rotation transformation matrix generation means produces a matrix of coordinate transformation which rotates the position of the object after the rotation when the object image is initially displayed to the target position, and multiplies the resulting matrix to the matrix of coordinate transformation used for the rotation when the object image is initially displayed, thereby producing a matrix of coordinate transformation for transforming the three-dimensional base coordinates to the three-dimensional target coordinates.

The object image is rotated around two predetermined axes of the three axes of the three-dimensional coordinate system. The axis of rotation is a line which passes through the origin and is normal to the plane formed by the origin of the three-dimensional coordinate system, the three-dimensional base coordinates and the three-dimensional target coordinates. Cancellation of operation is made possible through means for storing at least the old rotation transformation matrixes used in the past.

The inventive image manipulation method is capable of rotating a three-dimensional object image which is already displayed by allowing the operator to make direct access to the image. Consequently, the method can accomplish a user interface which, when displaying the three-dimensional image of an object seen from a certain viewpoint, allows the user to rotate the object image with the impression similar to rotating the actual object in real space.

According to the image manipulation method based on this invention, when the operator enters base coordinates which are the reference of operation and target coordinates while viewing the displayed object image, a rotation transformation matrix, which rotates the object image such that the portion located at the position of base coordinates is moved to the position of target coordinates, is produced from the base and target coordinates. This enables the operator to rotate the object image by making direct access to the object image which is already displayed, and accomplishes a sophisticated user interface which allows the user to rotate the object image with the impression similar to rotating the actual object in real space.

In addition, the inventive image manipulation method is designed to rotate the object image successively such that the portion located at the position of base coordinates is moved to the positions of target coordinates in subsequent steps responsive to the successive entries of target coordinates. Consequently, the operator can determine a proper amount of rotation while viewing the three-dimensional object image produced in response to the command input. Moreover, the method is designed to rotate the object image by allowing the operator to directly access to the screen section where the object image is displayed.

BRIEF DESCRIPTION OF THE DRAWINGS

FIGS. 6A and 6B are diagrams used to explain, as an example, the order of storing boundary positions;

FIGS. 7A and 7B are diagrams used to explain an example of the image manipulation method based on this invention;

DESCRIPTION OF THE PREFERRED EMBODIMENTS

The image display method of this invention will be explained in detail with reference to the drawings.

Figure 1:
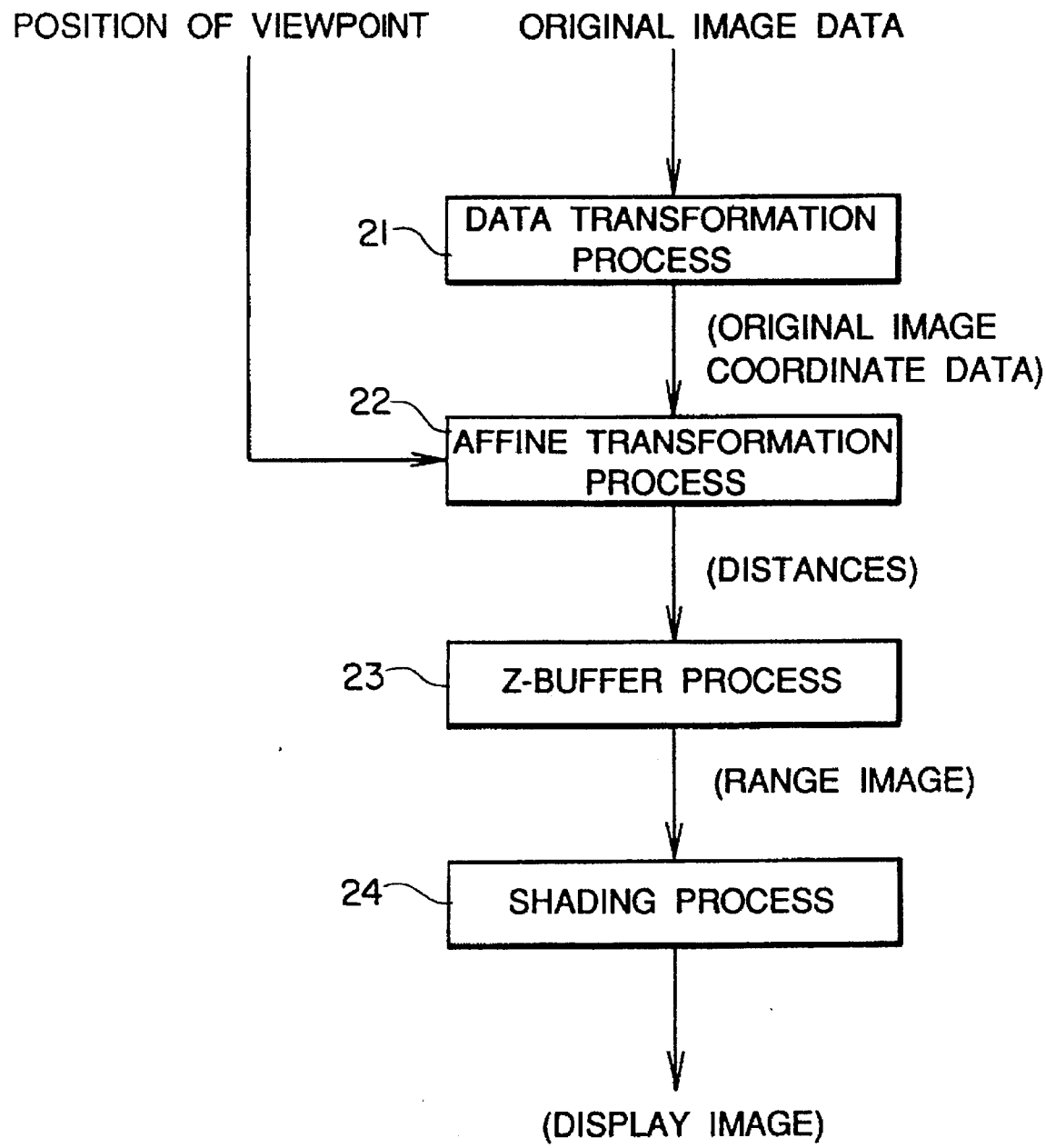
FIG. 1 is a flowchart showing the image display operation based on the first embodiment of this invention.

FIG. 1 shows in flowchart form the image display method based on the first embodiment of this invention. Initially, a set of voxel-wise original image data of an object is transformed into original image coordinate data (data transformation process:step 21). This stored data represents boundary positions of the object detected through the search of the object data along predetermined multiple directions. Next, boundary positions detected in several search directions are selected from among all boundary positions of all search directions by using the original image coordinate data. The selected boundary positions are converted into coordinate values on the display plane and distances from the display plane through a coordinate transformation process, e.g., the affine transformation (affine transformation process:step 22). The affine transformation used here includes the transformation of parallel movement. Next, distances nearest to the display plane are selected by using a z-buffer to thereby create a range image of the object (z-buffer process:step 23). Next, the image is shaded based on the range image (shading process:step 24), and finally the shaded image is displayed on the screen.

Figure 2:
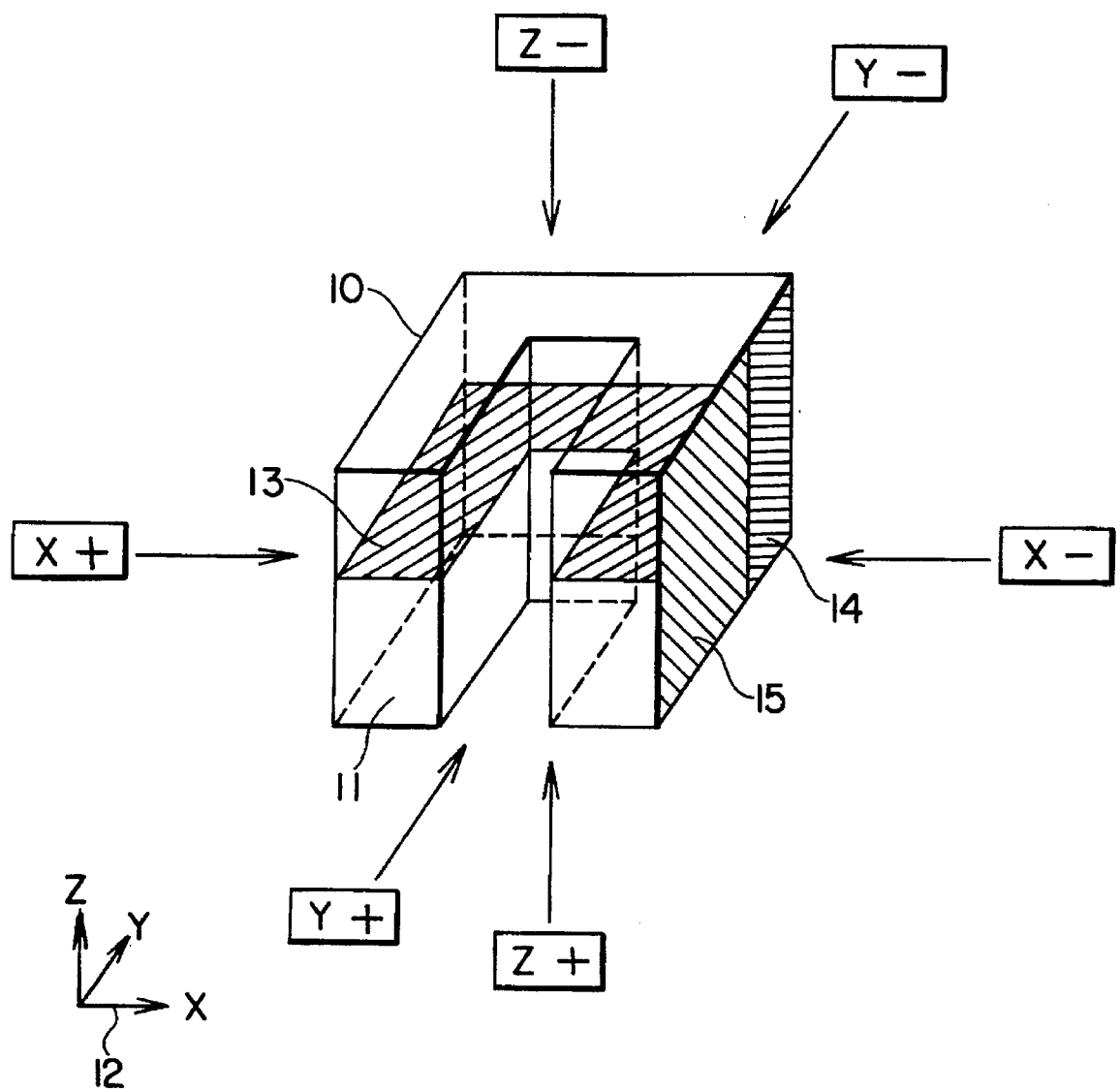
FIG. 2 is a perspective diagram showing an example of the object to be displayed in three-dimensional fashion.

FIG. 2 shows an example of the object to be displayed in three-dimensional fashion according to this invention. The procedure of the three-dimensional display method shown in FIG. 1 will be explained. An object 10 shown in FIG. 2 is a solid body having a bottom plane 11, and it is expressed by voxels based on a rectangular coordinate system 12 having the x, y and z axes. Voxel is the simplified term of "volume cell", signifying a picture element of a three-dimensional image in contrast to a pixel of a two-dimensional image.

According to this invention, the original image data is first transformed into original image coordinate data by the data transformation process 21. The original image coordinate data represents boundary positions of the object 10 detected through the search of the object data along the six directions (x+, x−, y+, y−, z+ and z−) of the coordinate system 12.

Figure 3:
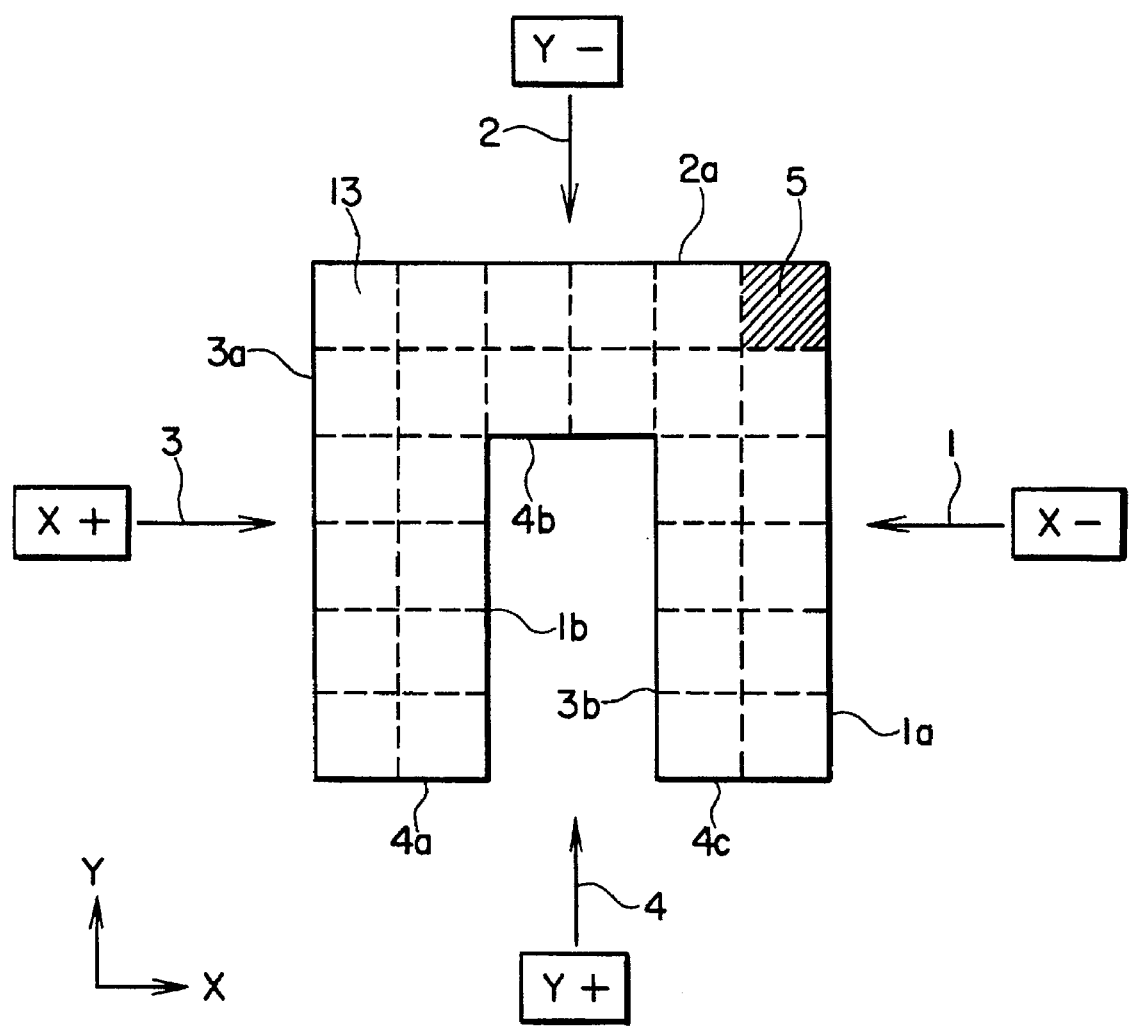
FIG. 3 is a diagram used to explain the two-dimensional original image coordinate data for the object shown in FIG. 2.

For better understanding, attention is first paid to the object 10 on the xy plane 13 as shown in FIG. 3 which explains the original image coordinate data. Indicated by 1a, 1b, 2a, 3a, 3b, 4a, 4b and 4c are boundaries of object in the x−, y−, x+ and y+ directions. Among these boundaries, those encountered when the object is searched from outside to inside of the object along predetermined directions (axes of original image data) are selected, and their boundary positions are stored. For example, boundary positions of 1a and 1b are stored for the x− direction 1. In this manner, boundary positions 2a;3a and 3b;and 4a, 4b and 4c are stored for the y−, x+ and y+ directions, respectively. Boundary positions are selected and stored also for the z+ and z− directions in the same manner.

Figure 4:
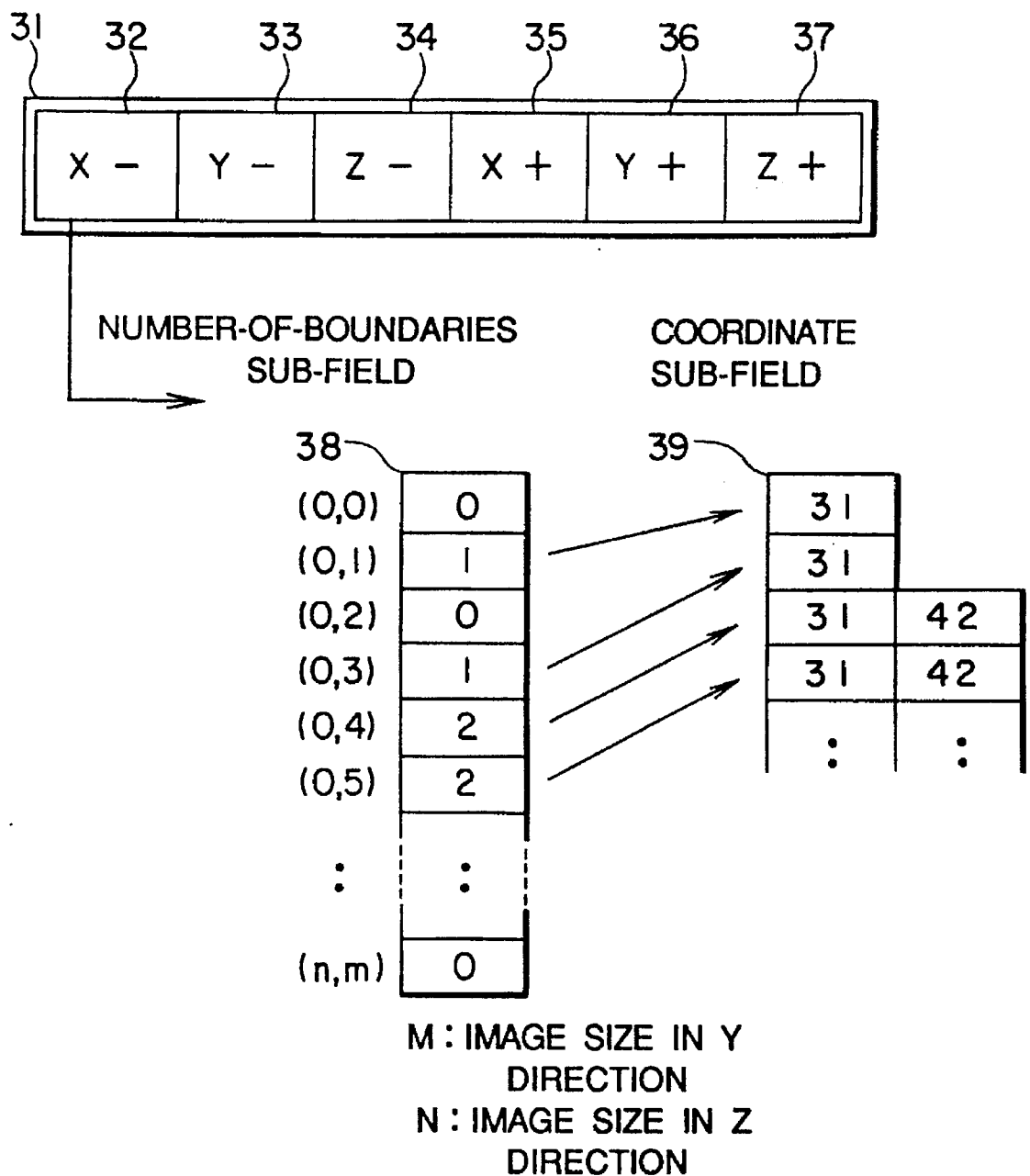
FIG. 4 is a diagram used to explain the structure of the original image coordinate data based on this invention.

FIG. 4 explains the structure of the original image coordinate data. For detecting a boundary position in the x− direction (32), for example, in the data structure 31 of FIG. 4, a line segment which passes through a position on the yz plane and is parallel to the x axis is established. Next, the original image data (voxels) on this line segment is accessed sequentially in the positive-to-negative direction along the x axis. During the access, the position at which the value indicates the transition from outside to inside of the object is detected, and the x coordinate of the position is read and stored in the coordinate field of the data structure. In this manner, coordinates of positions can be evaluated without the need of intricate image processes.

A method of storing the detected boundary positions is the use of the data structure as shown in FIG. 4 for example. In the figure, shown by 31 is the whole original image coordinate data, and boundary positions detected in the above-mentioned manner are stored separately in fields 32–37 for six directions. The boundary position field of each direction (e.g., x− direction 32) consists of a number-of-boundaries sub-field 38 and a boundary coordinate sub-field 39.

The number sub-field 38 stores the number of boundary positions in the x− direction on the yz plane sequentially based on the coordinates of the yz plane. For example, the object 10 of FIG. 2 has one boundary in a region 14 (it corresponds to 1a in FIG. 3) and two boundaries in a region 15 (they correspond to 1a and 1b in FIG. 3) in the x− direction. According to the storing manner of FIG. 4, the number of boundaries is stored for every set of coordinate values of the z and y directions (e.g., 0, 0;0, 1;and so on). In the example of FIG. 2, the number of boundaries is zero for a position where the search line segment does not encounter the object 10, one for the region 14, two for the region 15, and zero again when the search line segment does not meet the object.

The coordinate sub-field 39 stores x coordinates of the boundary positions sequentially based on the coordinates of the yz plane. In the example of FIG. 4, x coordinates 31 and 42 are stored. X coordinates are absent for corresponding number sub-fields that contain zero. In the figure, arrows are appended only to non-zero number sub-fields. The size of the number sub-field is determined from the size of original image data, while the size of the coordinate sub-field varies depending on the shape of the object.

The original image coordinate data resulting from the data transformation process (step 21) is converted into coordinates on the display plane and distances from the display plane by the affine transformation process (step 22). The affine transformation process includes the selection of boundary positions to be processed and the affine transformation for the selected boundary positions.

First, the boundary positions to be rendered the affine transformation are selected from among boundary positions 32–37 in six directions represented by the original image coordinate data shown in FIG. 4 depending on the polarity of components i, j and k of a vector which is normal to the display plane and points from the display plane to the object. The selecting process takes place for each of x, y and z directions sequentially as follows.

(a) Selection of boundary positions in the x direction

For i<0, boundary positions (32) in x− direction are selected.

For i=0, the affine transformation is not applied to boundary positions in x direction.

For i>0, boundary positions (35) in x+ direction are selected.

(b) Selection of boundary positions in the y direction

For j<0, boundary positions (33) in y− direction are selected.

For j=0, the affine transformation is not applied to boundary positions in y direction.

For j>0, boundary positions (36) in y+ direction are selected.

(c) Selection of boundary positions in the z direction

For k<0, boundary positions (34) in z− direction are selected.

For k=0, the affine transformation is not applied to boundary positions in x direction.

For k>0, boundary positions (37) in z+ direction are selected.

Next, the affine transformation is carried out for the selected boundary positions as shown in FIG. 1 so that these values are converted into coordinates on the display plane and distances from the display plane. The resulting values are sent to the z-buffer.

The z-buffer process (step 23) uses the z-buffer associated with the display plane to select a distance nearest to the display plane from among the distances provided by the affine transformation process, and creates a range image of the object. The range image is delivered for the shading process (step 24).

Finally, the shading process (step 24) determines the degree of shading from the range image itself and its gradient, and displays the resulting image on the CRT screen or the like.

Figure 5:
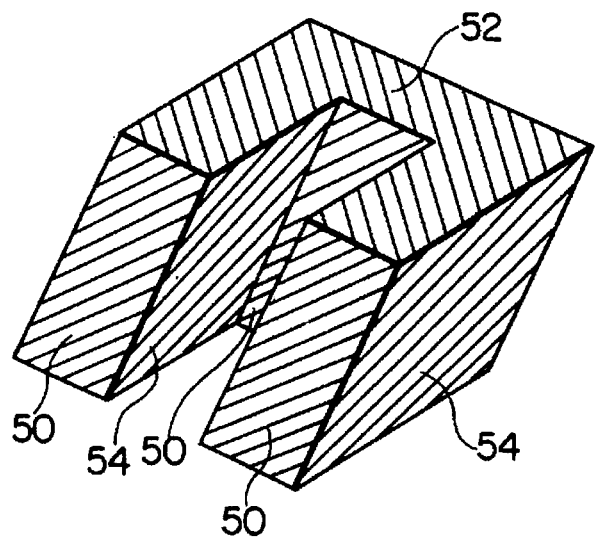
FIG. 5 is a diagram showing an example of three-dimensional display.

FIG. 5 shows an example of three-dimensional display. On completion of the shading process (step 24) of this invention, an image as shown in FIG. 5 is displayed on the CRT screen. In this example, the image is provided with three-tone shading: the front surfaces 50 which face the viewpoint are brightest, the upper surface 52 with a smaller inclination is fairly bright, and the side surfaces 54 with a large inclination are the darkest.

According to the inventive method, it is possible to make three-dimensional display of an object seen from an arbitrary viewpoint through the provision of original image coordinate data which represents boundary positions of the object obtained through the search of the object along predetermined multiple directions. The process necessitates only the affine transformation for the original image coordinate data of boundary positions and the comparison and substitution of distances in the z-buffer. Consequently, the number of data accesses and computation can be reduced, and three-dimensional display can be sped up as a result.

The transformation process to produce the original image coordinate data is merely the sequential access to the voxel-wise original image data along the predetermined directions, and intricate image processes such as tracking on the object surface are unneeded, whereby the three-dimensional display operation based on the coordinates of boundaries is made possible.

Although in the above explanation, boundary positions are converted into coordinates on the display plane and distances from the display plane through the affine transformation including the parallel movement, the boundary positions may be converted into coordinates on the display plane and distances from the display plane when the display plane is moved to the origin of coordinates of the object through the general coordinate transformation scheme without including the parallel movement. Even in this case, the result is sent to the z-buffer as explained previously.

Next, the second embodiment of this invention will be explained.

In contrast to the first embodiment, in which boundary positions of the object are detected through the search in the predetermined outside-to-inside direction in the data transformation process to obtain the original image coordinate data, it is also possible to detect boundary positions in the inside-to-outside direction. In this case, the boundary positions to be rendered the affine transformation are selected for each of the x, y and z directions as follows.

(a) Selection of boundary positions in the x direction

For i>0, boundary positions in x– direction are selected.

For i=0, the affine transformation is not applied to boundary positions in x direction.

For i<0, boundary positions in x+ direction are selected.

(b) Selection of boundary positions in the y direction

For j>0, boundary positions in y– direction are selected.

For j=0, the affine transformation is not applied to boundary positions in y direction.

For j<0, boundary positions in y+ direction are selected.

(c) Selection of boundary positions in the z direction

For k>0, boundary positions in z– direction are selected.

For k=0, the affine transformation is not applied to boundary positions in x direction.

For k<0, boundary positions in z+ direction are selected.

Next, the third embodiment of this invention will be explained.

In the first embodiment, there is a possibility of duplicate storing of the same coordinates as original image coordinate data and duplicate processing for the data. For example, a voxel 5 in FIG. 3 is located at boundaries of both x– and y–directions. In order to avoid the duplicate treatment for the same position, a possible manner is to prepare compressed coordinate data of original image, in which stored duplicate boundary positions are removed from among the original image coordinate data, and produce a range image from the compressed coordinate data. This method is carried out as follows. First, the following eight kinds of compressed coordinate data of original image A{ } are produced from the original image coordinate data. These compressed coordinate data are derived from three sets of original image coordinate data selected depending on the position of the viewpoint through the removal of duplicate boundary positions.

A{– – –} is a set of data provided by removing duplicate positions on boundaries in the x–, y– and z– directions.

A{– –+} is a set of data provided by removing duplicate positions on boundaries in the x+, y– and z– directions.

A{–+–} is a set of data provided by removing duplicate positions on boundaries in the x–, y+ and z–directions.

A{–++} is a set of data provided by removing duplicate positions on boundaries in the x+, y+ and z– directions.

A{+– –} is a set of data provided by removing duplicate positions on boundaries in the x–, y– and z+ directions.

A{+–+} is a set of data provided by removing duplicate positions on boundaries in the x+, y– and z+ directions.

A{++–} is a set of data provided by removing duplicate positions on boundaries in the x–, y+ and z+ directions.

A{+++} is a set of data provided by removing duplicate positions on boundaries in the x+, y+ and z+ directions.

Next, the affine transformation process is carried out for converting the resulting compressed coordinate data, in place of the original image coordinate data, into coordinates on the display plane and distances from the display plane. The selection of boundary positions to be rendered the affine transformation is based on the following criterion for example.

For i≦0, j≦0 and k≦0, A{– – –} is selected.
For i>0, j≦0 and k≦0, A{– –+} is selected.
For i≦0, j>0 and k≦0, A{–+–} is selected.
For i>0, j>0 and k≦0, A{–++} is selected.
For i≦0, j≦0 and k>0, A{+– –} is selected.
For i>0, j≦0 and k>0, A{+–+} is selected.
For i≦0, j>0 and k>0, A{++–} is selected.
For i>0, j>0 and k>0, A{+++} is selected.

The operation following the affine transformation process is identical to that described previously.

Next, the fourth embodiment of this invention will be explained.

Although in the third embodiment the compressed coordinate data of original image is produced from the original image coordinate data, it is also possible to produce the compressed coordinate data directly from the original image data based on the connectivity with neighboring voxels.

The procedure of this method will be explained. First, attention is paid to one voxel within the object, and it is tested whether each of six neighboring voxels (6-connectivity) is located inside or outside of the object. The term "6-connectivity" used here signifies six voxels, with only one coordinate value among x, y and z coordinates of each voxel being different from others by +1 or −1. Accordingly, if at least one of these six voxels is found to be outside of the object, the voxel in attention is determined to be located on a boundary and its position is stored as one of eight kinds of compressed coordinate data A{ } as follows.

(a) In case a voxel having only its x coordinate different by +1 is outside the object, the boundary position is stored as compressed coordinate data of A{– – –} , A{–+–}, A{+– –} and A{++–}.

(b) In case a voxel having only its y coordinate different by +1 is outside the object, the boundary position is stored as compressed coordinate data of A{– – –}, A{– –+}, A{+– –} and A{+–+}.

(c) In case a voxel having only its z coordinate different by +1 is outside the object, the boundary position is stored as compressed coordinate data of A{– – –}, A{– –+}, A{–+–} and A{–++}. (d) In case a voxel having only its x coordinate different by −1 is outside the object, the boundary position is stored as compressed coordinate data of A{--+}, A{-++}, A{+-+} and A{+++}.

(e) In case a voxel having only its y coordinate different by −1 is outside the object, the boundary position is stored as compressed coordinate data of A{-+-}, A{-++}, A{++-} and A{+++}.

(f) In case a voxel having only its z coordinate different by −1 is outside the object, the boundary position is stored as compressed coordinate data of A{+--}, A{+-+}, A{++-} and A{+++}.

For example, if only two voxels having different coordinates of x and y by +1, respectively, exist, the boundary position is stored as the compressed coordinate data of the above items (a) and (b). When there exists compressed coordinate data of the same kind for more than one condition, such as A{----} and A{+---}, the boundary position is stored only once. If all of six neighboring voxels are inside the object, the voxel position is not stored as compressed coordinate data.

By carrying out the search of neighboring voxels and storing of coordinates described above for all voxels inside the object, the compressed coordinate data of original image can be produced directly from the original image data.

The operation following the generation of compressed coordinate data is identical to that described previously.

Next, the fifth embodiment of this invention will be explained.

The third and fourth embodiments are intended for the speeding up the process based on the data structure in which the compressed coordinate data of the original image can be processed from the boundary position farthest from the position of the viewpoint.

Figure 6A:
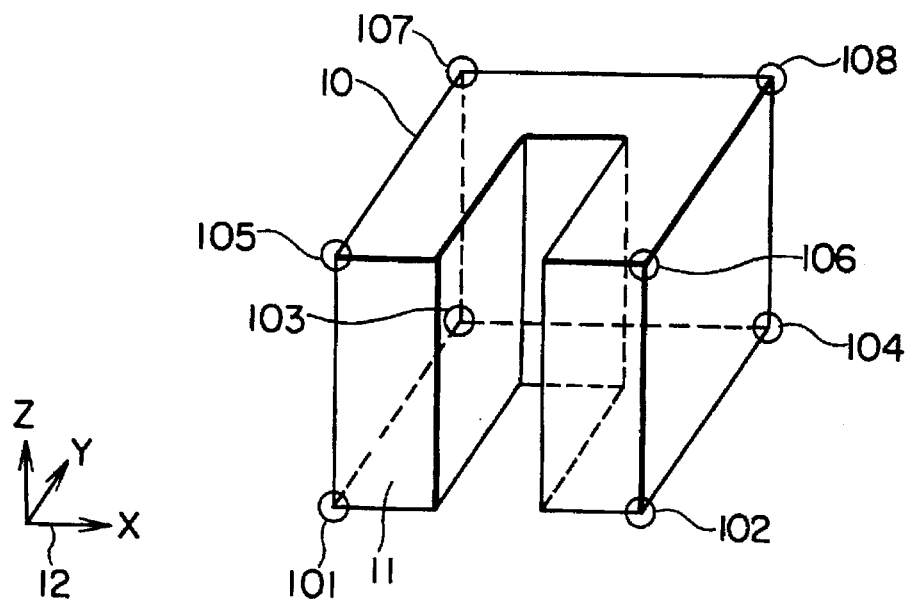

FIGS. 6A and 6B are diagrams used to explain an example of the method of storing the compressed coordinate data of boundary positions. Boundary positions of the object 10 which are used in the previous explanation are stored in this example. The compressed coordinate data of original image has basically the same structure as the original image coordinate data shown in the example in FIG. 4, with a difference being that eight kinds of compressed coordinate data A{ } are stored separately by rearranging the storing order of boundary positions for each data group as shown in the table of FIG. 6B, instead of storing the data separately for six directions 32–37.

In the table of FIG. 6B, the store start position signifies the boundary position which is stored first in the coordinate field, and these boundary positions are marked by small circles accompanied by numerals 101–108 on the object 10 in FIG. 6A. The store order of coordinate field specifies the order of storing boundary positions when more than one positions with different x coordinate values exist, and the ascending order is to store by starting at the position with the smallest x coordinate and the descending order is to store by starting at the position with the largest x coordinate. The store order of number field specifies the order of storing elements in the field of the number of boundaries, and forward order is the ascending direction of coordinate and the reverse order is the descending direction of coordinate. The previous example of FIG. 4 is the case of the forward storing order of the number field for both of the y and z axes. For example, if the y axis is stored in the reverse order and the z axis is stored in the forward order, the number field N(z, y) is stored in the order of N(0, m), N(0, m−1), N(0, m−2), . . . and so on.

Based on this data structure, boundary positions to be rendered the affine transformation (i.e., compressed coordinate data of original image) are obtained by being stored sequentially starting at the boundary position farthest from the position of the viewpoint. For example, if the viewpoint position has all positive x, y and z coordinates, the above-mentioned vector pointing from the display plane to the object has negative components i, j and k and therefore the compressed coordinate data A{ } is selected. Boundary positions are stored in this field, with the starting position being 101 as shown in FIG. 6B which is the farthest position from the viewpoint.

Accordingly, by reading out boundary positions on a first-in-first-out basis, implementing the affine transformation process, and overwriting the result in the z-buffer, the buffer contents can be revised such that a distance farther from the display plane which has been written earlier is replaced with a distance nearer to the display plane which is written later. Eventually, the distance farthest from the display plane is left stored in each field, resulting in a range image of the object. This method eliminates the need of comparison of distances in creating the range image of the object by use of the z-buffer, and the process can be sped up.

Although in the first embodiment boundary positions of the object are detected through the search of the entire original image data for producing the original image coordinate data, another possible method for detecting a boundary position is to search from a voxel inside the object for a neighboring voxel along a predetermined direction. For example, for a voxel inside the object it is tested along the x-direction (32) whether another voxel which is adjacent in the positive x axis direction (i.e., a voxel at a position only different by +1 in the x coordinate) is inside or outside of the object. If the test result reveals the neighboring voxel to be outside, the voxel position in attention is found to be on the boundary, and its coordinate value is stored in the coordinate sub-field of the data field (31).

Although the first embodiment necessitates the comparison of distances in creating the range image of the object by use of the z-buffer, this process can be eliminated by storing boundary positions in the order starting at the boundary position farthest from the position of the viewpoint and accordingly the process can be sped up. For example, in displaying the object 10 shown in FIG. 6, boundary positions are stored in the z-buffer by starting at a position as follows.

For $i \leq 0$, $j \leq 0$ and $k \leq 0$, process starts at boundary position 101.

For $i > 0$, $j \leq 0$ and $k \leq 0$, process starts at boundary position 102.

For $i \leq 0$, $j > 0$ and $k \leq 0$, process starts at boundary position 103.

For $i > 0$, $j > 0$ and $k \leq 0$, process starts at boundary position 104.

For $i \leq 0$, $j \leq 0$ and $k > 0$, process starts at boundary position 105.

For $i > 0$, $j \leq 0$ and $k > 0$, process starts at boundary position 106.

For $i \leq 0$, $j > 0$ and $k > 0$, process starts at boundary position 107.

For $i > 0$, $j > 0$ and $k > 0$, process starts at boundary position 108.

Although the first embodiment stores all boundary positions of the object through the search of the original image coordinate data along predetermined multiple directions, only part of these boundary positions may be stored. For example, only boundary positions near the external surface of the object that are likely selected as distances in the z-buffer are stored.

Although in the fourth embodiment, the compressed coordinate data of original image is produced based on 6-connectivity voxels, it is also possible to use the connectivity of more neighboring voxels such as 18-connectivity or 26-connectivity voxels. Using the compressed coordinate data based on 18-connectivity or 26-connectivity voxels enables the enhancement of picture quality, i.e., more smooth profile of the object image. As an example of the process for dealing with 18-connectivity voxels, 12 neighboring voxels are added to the 6-connectivity voxels by storing boundary positions of a voxel in attention as eight kinds of compressed coordinate data A{ } as follows. It should be noted that the terms "connectivity", "6-connectivity", "18-connectivity" and "26-connectivity" used here are consistent with the description of the article of The Transaction of the Institute of Electronics and Communication Engineers of Japan, J68-D, No. 4, pp. 426–433 (1985), entitled "Basics of Algorithms for Processing Three-dimensional Digitized Picture".

(a) In case a voxel having its x coordinate different by +1 and y coordinate different by +1 is outside the object, the boundary position is stored as compressed coordinate data of A{——} and A{+——}.

(b) In case a voxel having its x coordinate different by +1 and y coordinate different by −1 is outside the object, the boundary position is stored as compressed coordinate data of A{−+−} and A{++−}.

(c) In case a voxel having its x coordinate different by −1 and y coordinate different by +1 is outside the object, the boundary position is stored as compressed coordinate data of A{——+} and A{+−−+}.

(d) In case a voxel having its x coordinate different by −1 and y coordinate different by −1 is outside the object, the boundary position is stored as compressed coordinate data of A{−++} and A{+++}.

(e) In case a voxel having its x coordinate different by +1 and z coordinate different by +1 is outside the object, the boundary position is stored as compressed coordinate data of A{——} and A{−+−}.

(f) In case a voxel having its x coordinate different by +1 and z coordinate different by −1 is outside the object, the boundary position is stored as compressed coordinate data of A{+——} and A{++−}.

(g) In case a voxel having its x coordinate different by −1 and z coordinate different by +1 is outside the object, the boundary position is stored as compressed coordinate data of A{——+} and A{−−++}.

(h) In case a voxel having its x coordinate different by −1 and z coordinate different by −1 is outside the object, the boundary position is stored as compressed coordinate data of A{+−+} and A{+++}.

(i) In case a voxel having its y coordinate different by +1 and z coordinate different by +1 is outside the object, the boundary position is stored as compressed coordinate data of A{——} and A{—−+}.

(j) In case a voxel having its y coordinate different by +1 and z coordinate different by −1 is outside the object, the boundary position is stored as compressed coordinate data of A{+——} and A{+−−+}.

(k) In case a voxel having its y coordinate different by −1 and z coordinate different by +1 is outside the object, the boundary position is stored as compressed coordinate data of A{−+−} and A{−++}.

(l) In case a voxel having its y coordinate different by −1 and z coordinate different by −1 is outside the object, the boundary position is stored as compressed coordinate data of A{++−} and A{+++}.

For dealing with 26-connectivity voxels, eight neighboring voxels are added to the 18-connectivity voxels by storing boundary positions of a voxel in attention as eight kinds of compressed coordinate data A{ } as follows.

(a) In case a voxel having its x, y and z coordinates different by +1, +1 and +1, respectively, is outside the object, the boundary position is stored as compressed coordinate data of A{——}.

(b) In case a voxel having its x, y and z coordinates different by −1, +1 and +1, respectively, is outside the object, the boundary position is stored as compressed coordinate data of A{——+}.

(c) In case a voxel having its x, y and z coordinates different by +1, −1 and +1, respectively, is outside the object, the boundary position is stored as compressed coordinate data of A{−+−}.

(d) In case a voxel having its x, y and z coordinates different by −1, −1 and +1, respectively, is outside the object, the boundary position is stored as compressed coordinate data of A{−++}.

(e) In case a voxel having its x, y and z coordinates different by +1, +1 and −1, respectively, is outside the object, the boundary position is stored as compressed coordinate data of A{+——}.

(f) In case a voxel having its x, y and z coordinates different by −1, +1 and −1, respectively, is outside the object, the boundary position is stored as compressed coordinate data of A{+−+}.

(g) In case a voxel having its x, y and z coordinates different by +1, −1 and −1, respectively, is outside the object, the boundary position is stored as compressed coordinate data of A{++−}.

(h) In case a voxel having its x, y and z coordinates different by −1, −1 and −1, respectively, is outside the object, the boundary position is stored as compressed coordinate data of A{+++}.

Although the fifth embodiment is designed to speed up the process with the z-buffer based on the data structure in which boundary positions are stored as compressed coordinate data in the order starting at the boundary position farthest from the position of the viewpoint, the speeding-up of the process can also be achieved by varying the order of data access. For example, the coordinate sub-field is stored all in ascending order in the table of FIG. 6B and x coordinate values are read out in a variable order (ascending order or descending order), and the method enables the process to start at the position farthest from the viewpoint position. In this manner, the process for the number sub-field can also be sped up.

According to this invention, as described above, for displaying a three-dimensional image of voxel-wise object data, original image coordinate data of boundary positions detected through the search of the object data in predetermined multiple directions is produced in advance and a range image seen from an arbitrary viewpoint is produced from the original image coordinate data, and consequently the three-dimensional object image seen from an arbitrary viewpoint can be displayed merely through the affine transformation for the boundary positions stored as the original image coordinate data and the comparison and substitution of distances in the z-buffer. As a result, the number of data accesses and computation can be reduced, and eventually the three-dimensional image display operation can be sped up.

In addition, the transformation process to produce the original image coordinate data necessitates only sequential access to the voxel-wise original image data along predetermined directions, eliminating the need for intricate image processes such as tracking on the object surface, and the three-dimensional image display operation based on the coordinates of boundaries is made possible. It is also possible to enhance the picture quality of the displayed image.

Next, the image manipulation method based on this invention will be described.

The sixth embodiment of this invention will be explained in detail with reference to FIGS. 7A and 7B. This embodiment is intended to rotate the three-dimensional image of a human head as an example of the object, which is already displayed on the screen, through direct access to the displayed image. Initially, for the three-dimensional image 202 of the head on the screen 1 as shown in FIG. 7A, the position of the left mouth end 203 is entered as base coordinates (reference position for the operation), and next the position of a right face portion 204 is entered as target coordinates (target position for the operation). As a result, a three-dimensional image 206 of the head is displayed by being rotated such that the left mouth end 203 comes to the old position of the right face portion 204 as shown in FIG. 7B. The coordinates of the new left mouth end 205 on the screen shown in FIG. 7B is equal to the coordinates of the old right face portion 204 shown in FIG. 7A.

Figure 9:
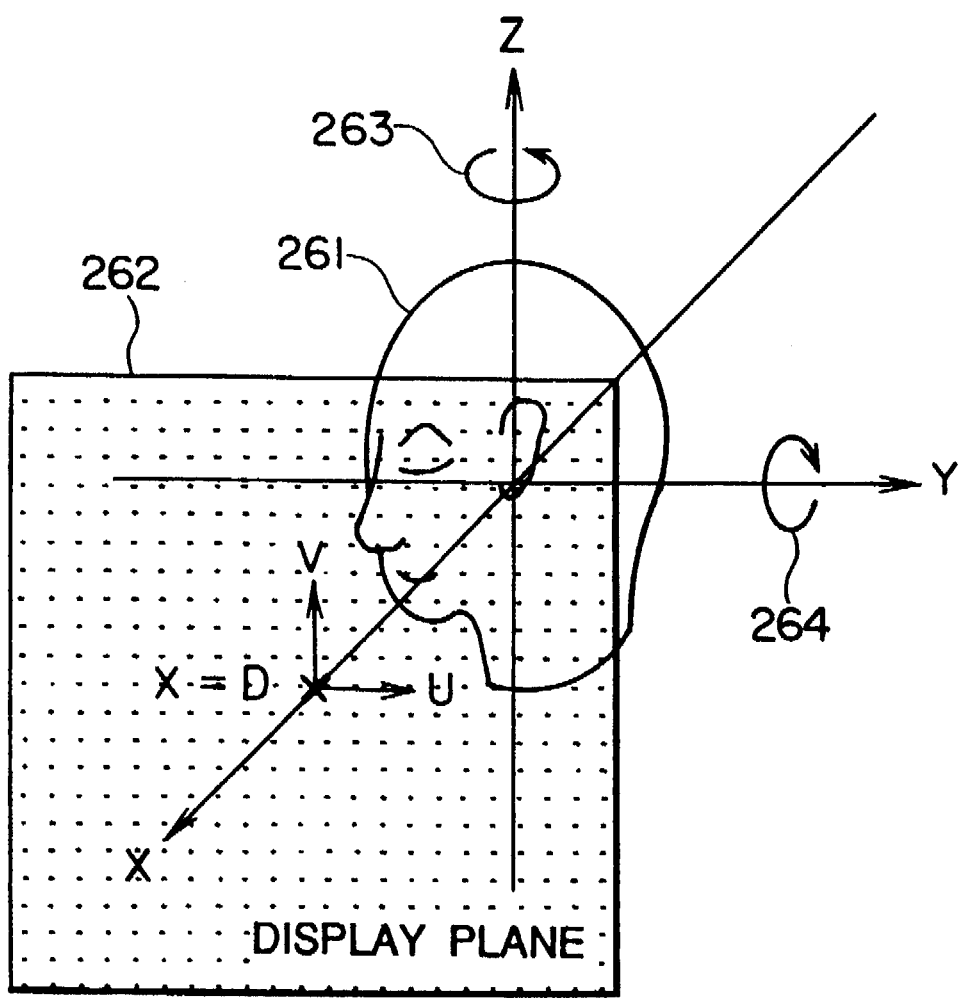
FIG. 9 is a diagram used to explain the positional relationship between the head section of the object and the display plane.

In this embodiment, it is assumed that the head to be displayed and the display plane have a positional relationship as shown in FIG. 9. The head 261 is placed so as to face the x axis direction, and the display plane 262 is a yz plane at x=D. The three-dimensional space has the x-y-z coordinate system and the display plane has a u-v coordinate system, with their origins being located at the center of the object and the center of the display plane (x axis), respectively.

The object is first rotated around a rotation axis 263 which is coincident with the z axis, and next rotated around another rotation axis 264 which is coincident with the y axis. The direction of rotation around the z axis is such that the positive x axis direction comes to the positive y axis direction, and the direction of rotation around the y axis is such that the positive x axis direction comes to the positive z axis direction.

Figure 8:
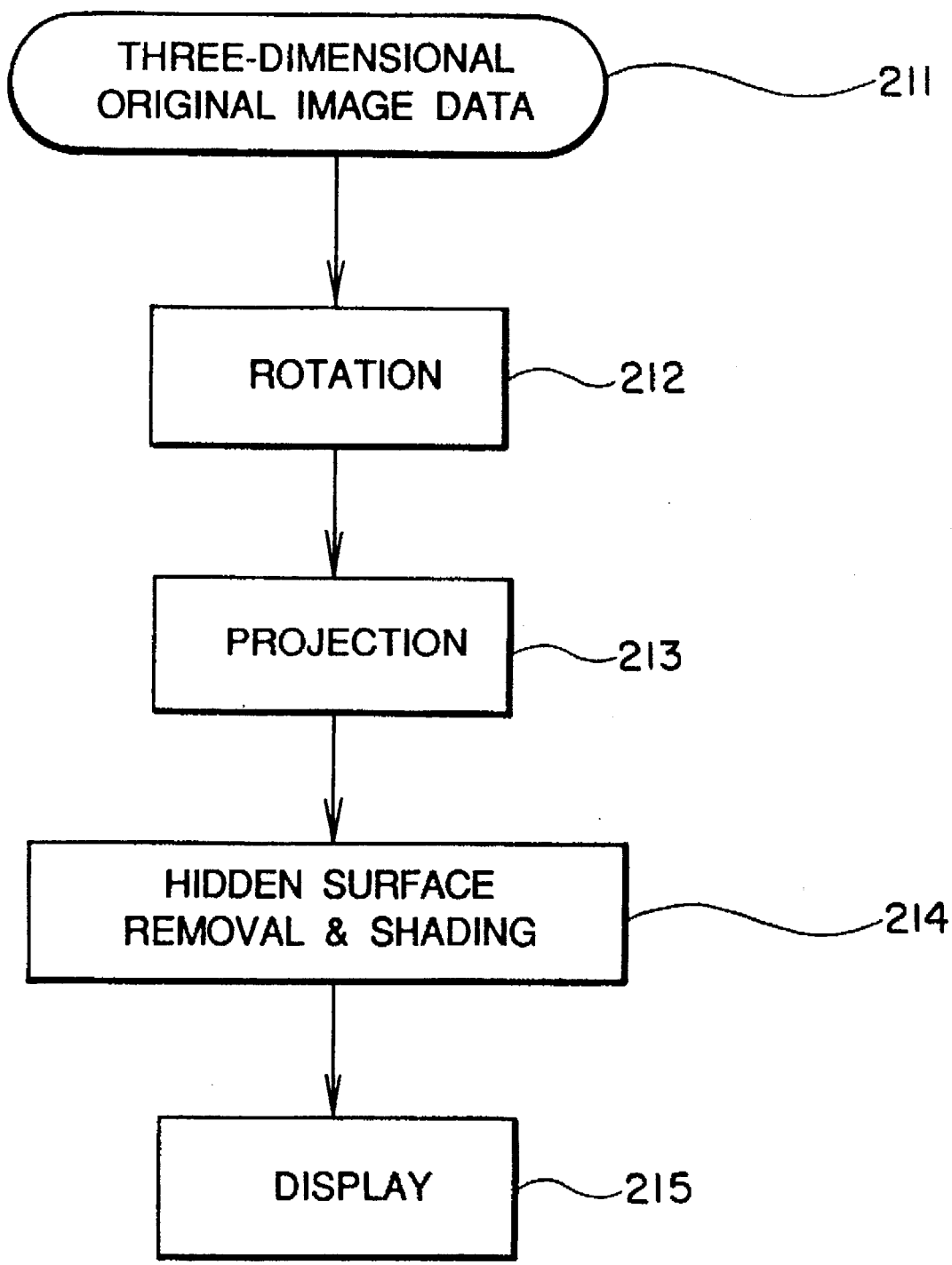
FIG. 8 is a flowchart explaining, as an example, the operation of displaying a three-dimensional image.
Figure 10:
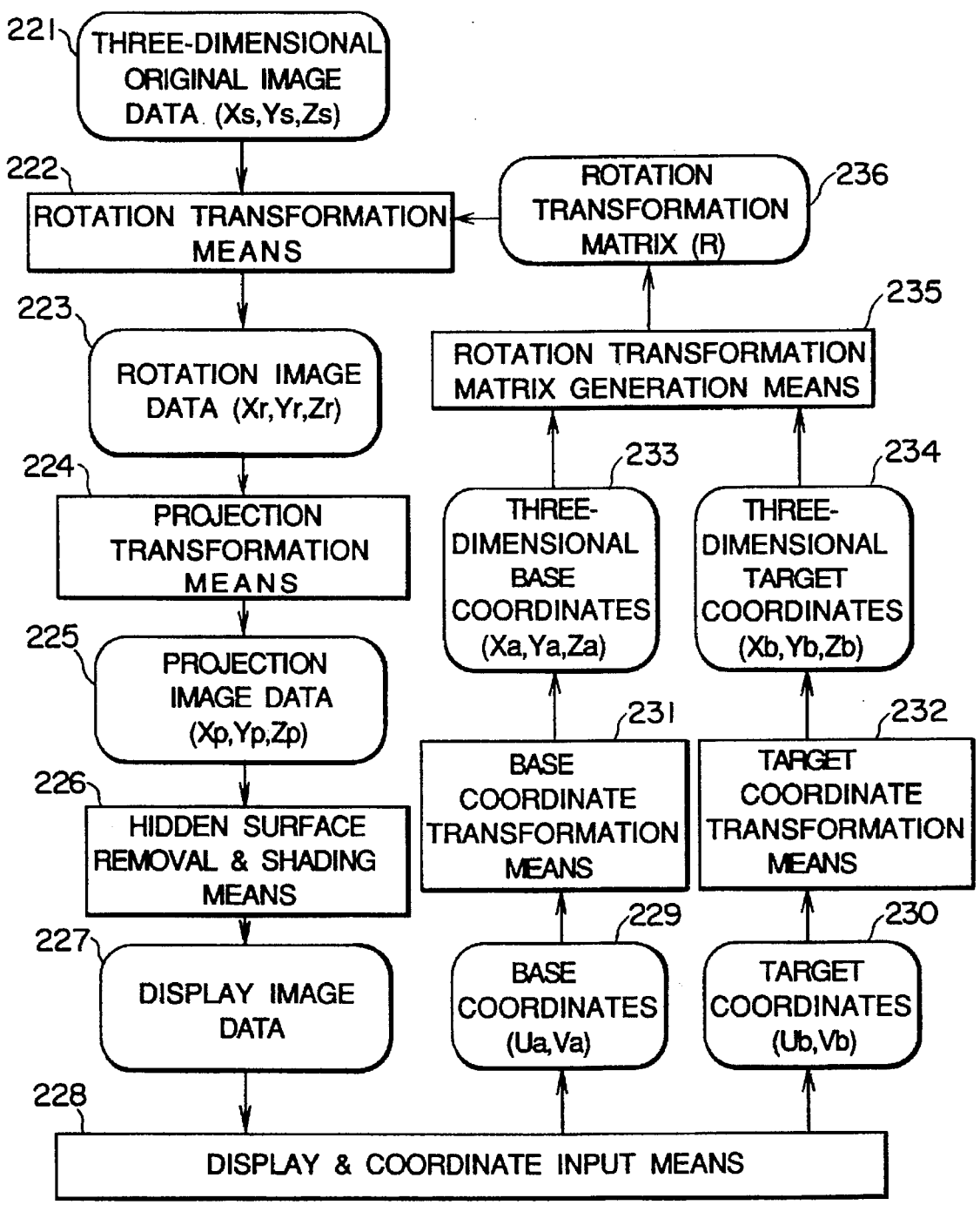
FIG. 10 is a flowchart explaining, as an example, the sequence of operations based on this invention.
Figure 11:
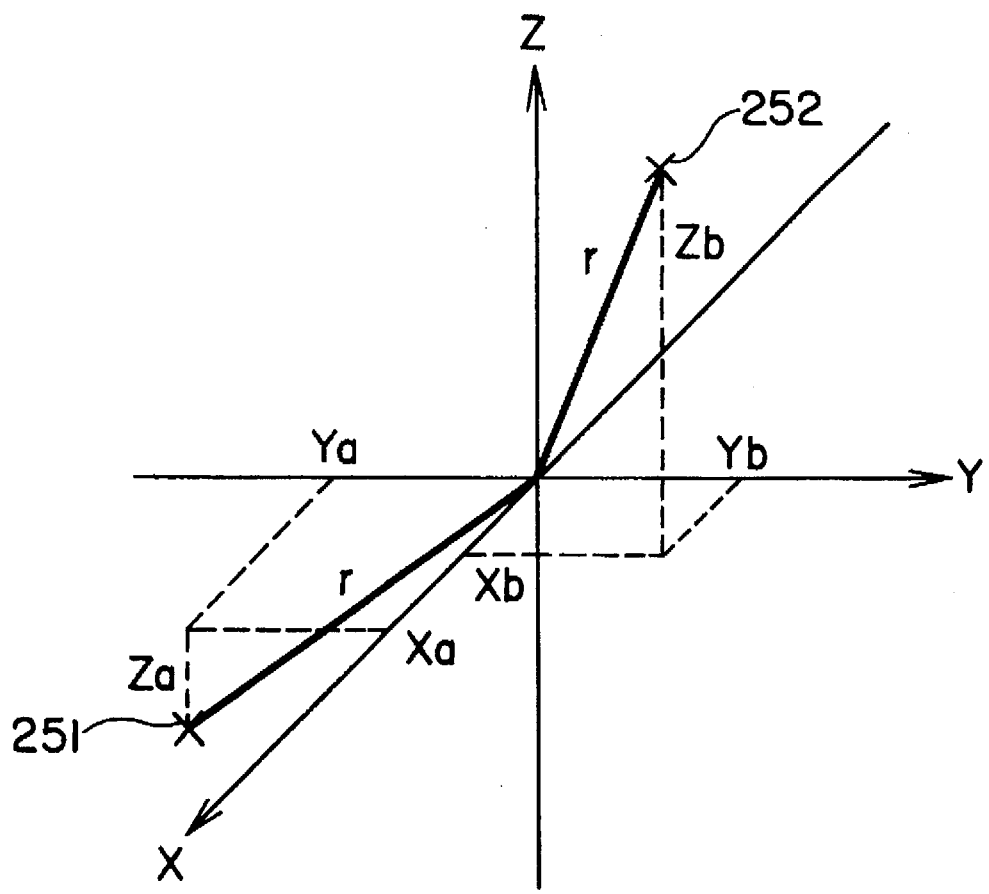
FIG. 11 is a diagram used to explain the target coordinate transformation means.

FIG. 10 shows the procedure of operation of this embodiment. Among the processing means shown in the figure, means 222, 224 and 226 used to display a three-dimensional image of an object seen from an arbitrary direction function identically to the one shown in FIG. 8. Other processing means 231, 232 and 235 are used specifically for this embodiment.

Initially, the function of each processing means will be explained. The rotation-transform means 222 rotates the three-dimensional image of object in accordance with a rotation transformation matrix. The resulting rotation image data 223 is sent to the projection transformation means 224, which performs the coordinate transformation necessary for the image projection to the predetermined display plane. The resulting projection image data 225 is sent to the hidden surface removal and shading means 226, which removes unseen hidden surfaces and shades surfaces in different tones so as to make a more solid appearance of the object. The resulting display image data 227 is sent to the image display and coordinate input means 228, which functions to display the image data 227 on the screen and evaluate the coordinates of a screen position in response to the pointing of the position on the screen by the operator who is viewing the displayed image. This means can be realized by such a display means as a CRT or liquid crystal display device and such a pointing means as a mouse device or touch panel in combination, for example. The resulting screen coordinates are sent as base coordinates 229 to the base coordinates transformation means 231 or as target coordinates 230 to the target coordinate transformation means 232. The base coordinate transformation means 231 converts the base coordinates 229 that are screen coordinates into three-dimensional coordinates for the object portion displayed at the position of base coordinates. The resulting three-dimensional base coordinates 233 are sent to the rotation transformation matrix generation means 235. The target coordinate transformation means 232 converts the target coordinates 230 that are screen coordinates into three-dimensional coordinates for the portion of the object after it has been moved from the position of base coordinates to the position of target coordinates by the rotation of the object. The resulting three-dimensional target coordinates 234 are sent to the rotation transformation matrix generation means 235. The rotation transformation matrix generation means 235 produces a transformation matrix for rotating the object such that the portion located at the position of base coordinates 229 is moved to the position of target coordinates 230. The resulting rotation transformation matrix 236 is sent to the rotation transformation means 222.

Next, the operational procedure of the inventive image manipulation method will be explained. First, the procedure of displaying the three-dimensional image of the head based on the three-dimensional original image data including the position and shape of the head will be explained briefly.

(1) Initially, the object image is rotated around the z axis and y axis by the rotation transformation means 222. This operation is the implementation of coordinate transformation (rotation transformation) for the three-dimensional coordinates $(X_s, Y_s, Z_s)$ of the head as follows.

$$\{X_r, Y_r, Z_r\} = \{X_s, Y_s, Z_s\} R$$

where R is the transformation matrix (rotation transformation matrix), and $(X_r, Y_r, Z_r)$ are the three-dimensional coordinates following the rotation and compare to the rotation image data 223.

The rotation transformation matrix R is given in terms of the rotational angles $\theta$ and $\phi$ around the z and y axes, respectively, as follows.

$$R = \begin{pmatrix} \cos\theta\cos\phi & \sin\theta & \cos\theta\sin\phi \\ -\sin\theta\cos\phi & \cos\theta & -\sin\theta\sin\phi \\ -\sin\phi & 0 & \cos\phi \end{pmatrix} \quad (1)$$

Alternatively, the rotation transformation matrix R produced by the rotation transformation matrix generation means, which will be explained later, may be used.

(2) Next, the coordinate transformation (projection transformation) for projecting the rotated object image to the display plane is implemented by the projection transformation means 224. The transformation for projection is a transformation process to vary the size of the object image depending on the distance to the display plane, and it is used for the perspective projection for example. This transformation process is as follows.

$$\{X_p, Y_p, Z_p\} = \{X_r, Y_r, Z_r\} P$$

where P is the transformation matrix (projection transformation matrix), and $(X_p, Y_p, Z_p)$ are the three-dimensional coordinates following the projection and compare to the projection image data 225.

The projection transformation matrix P is determined from the projection parameters such as the projection method and the position of display plane. In this embodiment, the display plane is located as shown in FIG. 9. Among the three-dimensional coordinates (Xp, Yp, Zp), Yp and Zp represent the U and V axis components of the display plane, and Xp represents the depth of the object image.

(3) Finally, the image is rendered the hidden surface removal and shading by the hidden surface removal and shading means 226 so as to make a more solid appearance for the image.

The hidden surface removal is carried out by using the depth value for example. For this process, a buffer (z-buffer) for appending the depth value to each voxel is used, and the depth value nearest to the display plane is selected and stored for each voxel, and unseen surfaces are removed. This method is called "z-buffer algorithm".

The visible surfaces are shaded in different tones depending on the position of the light source and the distance to the display plane, and a display image data 227 is completed. The display image data 227 is displayed on the screen of the display and coordinate input means 228. These are the operations for displaying a three-dimensional image of the head.

Next, the operational procedure of rotating the three-dimensional image of the head, which is displayed as shown in FIG. 7A by the foregoing process, to produce the image of FIG. 7B will be explained.

(1) Initially, the display and coordinate input means 228 evaluates the coordinates (Ua, Va) of a position on the screen pointed by the operator. For example, this position is the left mouth end shown by 203 in FIG. 7A, and the coordinates of this position are defined to be the base coordinates 229.

(2) Next, the base coordinate transformation means 231 converts the base coordinates (Ua, Va) into three-dimensional base coordinates (Xa, Ya, Za). The resulting coordinates are in the form before the projection transformation implemented by the projection transformation means 224, i.e., after the rotation transformation by the rotation transformation means 222.

For example, when the hidden surface removal is carried out based on the z-buffer algorithm, the three-dimensional base coordinate transformation is as follows.

$$\{Xa, Ya, Za\} = \{Wa, Ua, Va\}P^{-1}$$

where Wa is the depth value at the base coordinates (Ua, Va) among the depth values Xp stored in the z-buffer, and $P^{-1}$ is the inverse matrix of the projection transformation matrix P.

Alternatively, among the portions displayed at the base coordinates (Ua, Va) as a result of rotation and projection, the one appearing on the screen (nearest to the display plane) is selected and the three-dimensional coordinates of that position are calculated.

(3) Next, the display and coordinate input means 228 evaluates the coordinates (Ub, Vb) of a position on the screen pointed by the operator. For example, this position is the right face portion shown by 204 in FIG. 7A, and the coordinates of this position are defined to be the target coordinates 230.

(4) Next, the target coordinate transformation means 232 converts the target coordinates (Ub, Vb) into three-dimensional base coordinates (Xb, Yb, Zb). The resulting coordinates are in the form before the projection transformation implemented by the projection transformation means 224, i.e., after the rotation transformation by the rotation transformation means 222.

The operational procedure will be explained in the following.

For the depth value Wb after the rotation, the following expression holds.

$$\{Xb, Yb, Zb\} = \{Wb, Ub, Vb\}P^{-1}$$

The inverse matrix $P^{-1}$ of the projection transformation matrix P is defined to be:

$$P^{-1} = \begin{pmatrix} a & d & g \\ b & e & h \\ c & f & i \end{pmatrix} \quad (2)$$

Then, Xb=A+aWb
Yb=B+dWb
Zb=C+gWd
where A=bUb+cVb
B=eUb+fVb
C=hub+iVb

During the rotation of the object, if the rotation axis passes through the origin of the three-dimensional coordinate system, the distance from the origin to a portion of the object is constant. Accordingly, the distance from the origin to the three-dimensional base coordinates 251 is equal to the distance from the origin to the three-dimensional target coordinates 252. This fact leads to the following expression.

$$\begin{aligned} r^2 &= Xb^2 + Yb^2 + Zb^2 \\ &= (A+aWb)^2 + (B+dWb)^2 + (C+gWd)^2 \\ &= LWb^2 + MWb + N \end{aligned}$$

where $$r^2 = Xa^2 + Ya^2 + Za^2$$

$$L = a^2 + b^2 + g^2$$

$$M = 2aA + 2dB + 2gC$$

$$N = A^2 + B^2 + C^2$$

The above quadratic equation is solved, and one of the resulting two depth values $Wb_1$ and $Wb_2$ nearest to the display plane is selected to be Wb.

The three-dimensional target coordinates are obtained by the following transformation.

$$\{Xb, Yb, Zb\} = \{Wb, Ub, Vb\}P^{-1}$$

In case the quadratic equation has no solution, it means that the portion displayed at the position of base coordinates cannot be rotated to the position of target coordinates. This situation can be treated by the prompting of another input for the target coordinates that enable rotation, or the target coordinate values are reduced while retaining the ratio of Ub to Vb.

Figure 12:
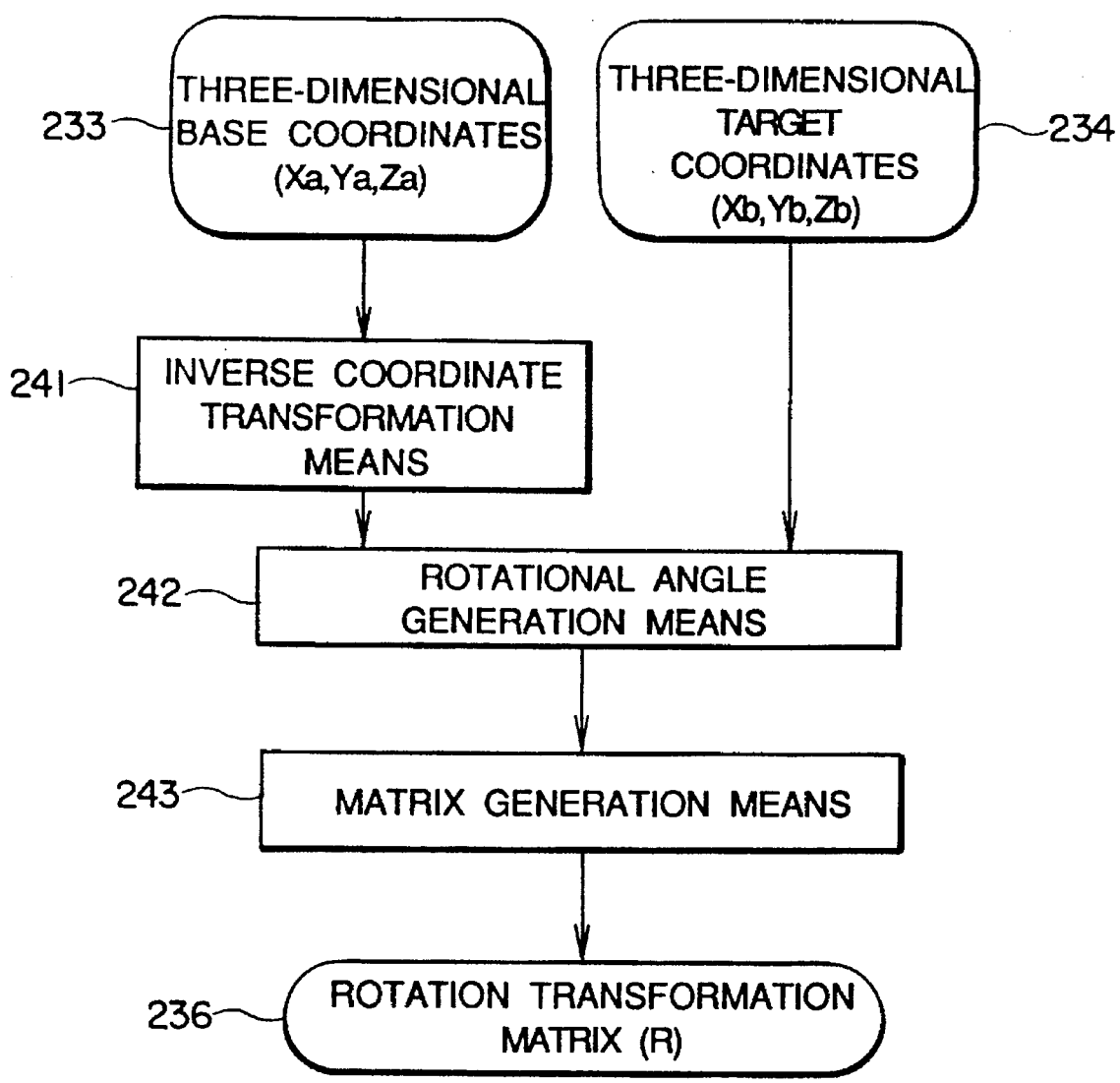
FIG. 12 is a flowchart explaining the operation of the rotation transformation matrix generation means based on the sixth embodiment.

(5) Next, the rotation coordinate matrix generation means 235 generates a rotation transformation matrix for rotating the object such that the portion displayed at the position of the base coordinates 229 is moved to the position of target coordinates 230. The operational procedure is as shown in FIG. 12 for example.

First, the inverse coordinate transformation means 241 implements the coordinate transformation for the three-dimensional base coordinates 233 to have the form before the rotation transformation by the rotation transformation means 222, i.e., the form corresponding to the coordinate values of the three-dimensional original image data. This transformation is expressed as follows.

$$\{Xd, Yd, Zd\} = \{Xa, Ya, Za\}R^{-1} \quad (3)$$

where $R^{-1}$ is the inverse matrix of the rotation transformation matrix R, and the three-dimensional coordinates (Xd, Yd, Zd) is the result of the transformation.

Figure 13:
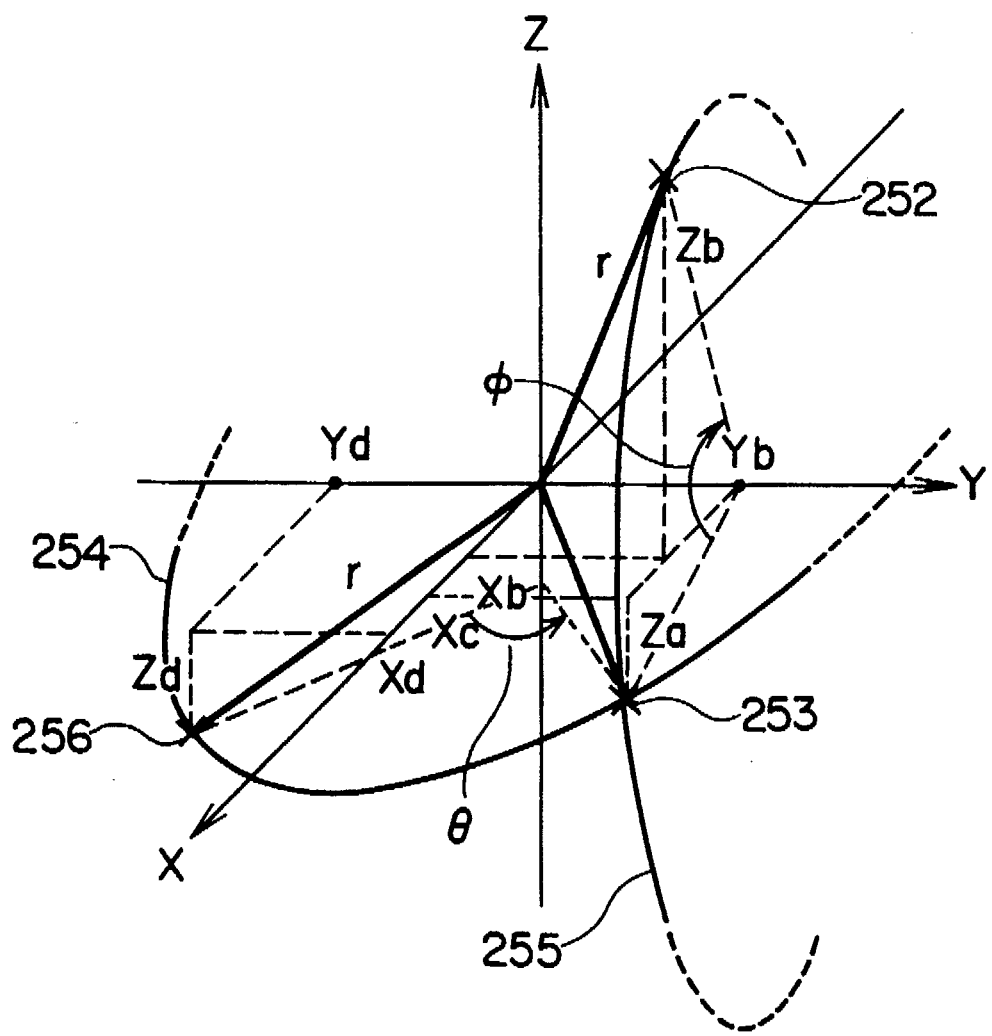
FIG. 13 is a diagram used to explain the rotational angle generation means.

Next, the rotational angle generation means 242 calculates the rotational angles θ and φ around the z and y axes. An example of this method will be explained on FIG. 13.

In the figure, indicated by 265 is the three-dimensional base coordinates (Xd, Yd, Zd) and 252 is the three-dimensional target coordinates (Xb, Yb, Zb). For rotating the position of the base coordinates 256 to the position of the target coordinates 252, the base coordinates 256 are first rotated around the z axis. The trace of rotation forms an arc as shown by 254. The rotation takes place until the y coordinate value is equal to Yb, at which the position 253 takes the following x coordinate value Xc.

$$Xc = \sqrt{(Xd^2 + Yd^2 - Yb^2)} \quad (4)$$

Next, the image is rotated around the y axis, and the three-dimensional base coordinates 256 are moved to the three-dimensional target coordinates 252. The rotational angles θ and φ are calculated as follows.

$$\theta = \theta b - \theta a, \quad \phi = \phi b - \phi a \quad (5)$$

where $\theta a = \tan^{-1}(Yd/Xd)$ $\theta b = \tan^{-1}(Yb/Xc)$ $\phi a = \tan^{-1}(Zd/Xc)$ $\phi b = \tan^{-1}(Zb/Xb)$, $\tan^{-1}(y/x) = \mathrm{Tan}^{-1}(y/x)$ (for $x \geq 0$)

$\pi + \tan^{-1}(y/x)$ (for $x < 0$, $y \geq 0$)

$-\pi + \tan^{-1}(y/x)$ (for $x < 0$, $y < 0$) (6)

Finally, the matrix generation means 243 produces a new rotation transformation matrix 236 based on the rotational angles θ and φ. The rotation transformation matrix R is generated using the expression (1).

(6) The new three-dimensional image produced from the three-dimensional original image data is displayed by using the new rotation transformation matrix 236 in the manner similar to the display operation for the three-dimensional image of the head shown in FIG. 7A. Consequently, a three-dimensional image resulting from the rotation of the head, with the left mouth end 203 being moved to the position of the right face portion 204, is displayed.

Although in this embodiment the rotational angles θ and φ are calculated from the expression (5), they can also be obtained by solving the following expression directly.

$$\{Xb, Yb, Zb\} = \{Xd, Yd, Zd\}R$$

Since R is given by the expression (1), Yb is calculated as follows.

$$Yb = Xd\sin\theta + Yd\cos\theta \quad (7)$$
$$= \sin(\theta + \phi)(\sqrt{(Xd^2 + Yd^2)})$$

where $\phi = \tan^{-1}(Yd/Xd)$.
Accordingly, $$\theta + \phi = \sin^{-1}(Yb/\sqrt{(Xd^2 + Yd^2)}) \quad (8)$$

Then, θ can be evaluated,
Similarly, Xb is obtained as follows.

$$Xb = Xd\cos\theta\sin\phi - Yd\sin\theta\sin\phi + Zd\cos\phi \quad (9)$$
$$= (Xd\cos\theta - Yd\sin\theta)\sin\phi + Zd\cos\phi$$
$$= G\sin\phi + Zd\cos\phi$$
$$= (\sqrt{(G^2 + Zd^2)})\sin(\phi + \delta)$$

where $G = Xd\cos\theta - Xd\sin\theta$, and $\delta = \tan^{-1}(Zd/G)$
Accordingly, $$\phi + \delta = \sin^{-1}(Xb/\sqrt{(G^2 + Zd^2)}) \quad (10)$$

Then, φ can be evaluated.

In this embodiment, the rotational angles are calculated based on the assumption that the Xc is always positive as suggested by the expression (4). However, even if the Xc takes a negative value, it is possible to rotate the image portion from the base coordinates to the target coordinates, and it is also possible to display the image by selecting one of the cases properly. The selection may be based on the specification given by the operator, or it may be done automatically depending on the positional relationship between the base coordinates and target coordinates.

Next, the seventh embodiment of this invention will be explained.

Figure 14:
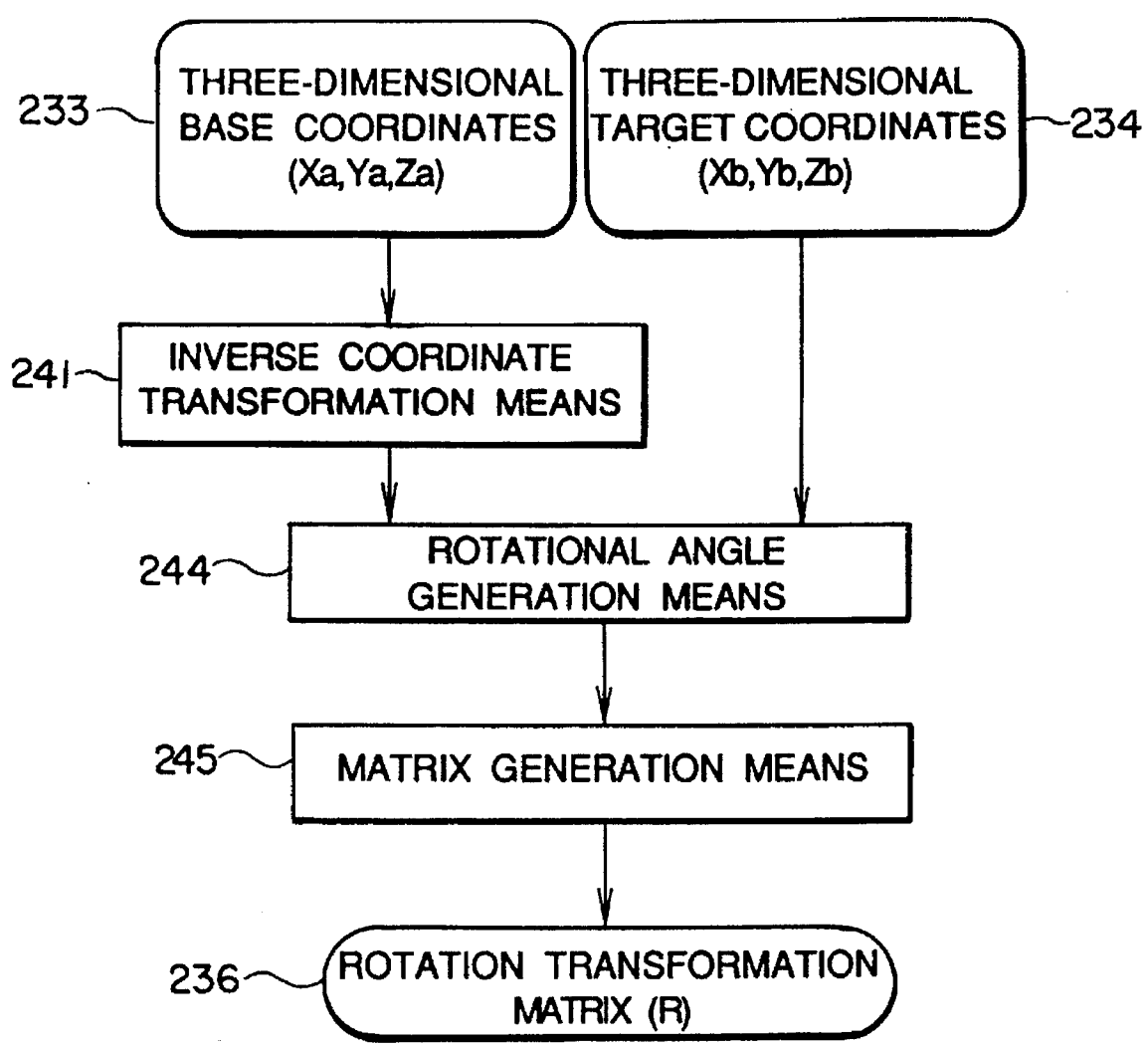
FIG. 14 is a flowchart explaining the rotation transformation matrix generation means based on the seventh embodiment.

Although the sixth embodiment is designed to rotate the object image to an intended position around an axis of the three-dimensional coordinate system, another method of rotation is based on the determination of a rotation axis from the base coordinates and target coordinates. For example, the rotation axis is a line segment which passes through the origin of the three-dimensional coordinate system and is normal to the plane which is formed by three points (the base coordinates, target coordinates and origin). In this case, the rotation transformation matrix generation means 235 produces a rotation transformation matrix in accordance with the operational procedure shown in FIG. 14 for example.

First, the inverse coordinate transformation means 241 implements the coordinate transformation expressed by the expression (3) as in the case of the sixth embodiment.

Next, the rotation axis generation means 244 determines the axis of rotation. An example of the operational procedure will be explained on FIG. 15.

Figure 15:
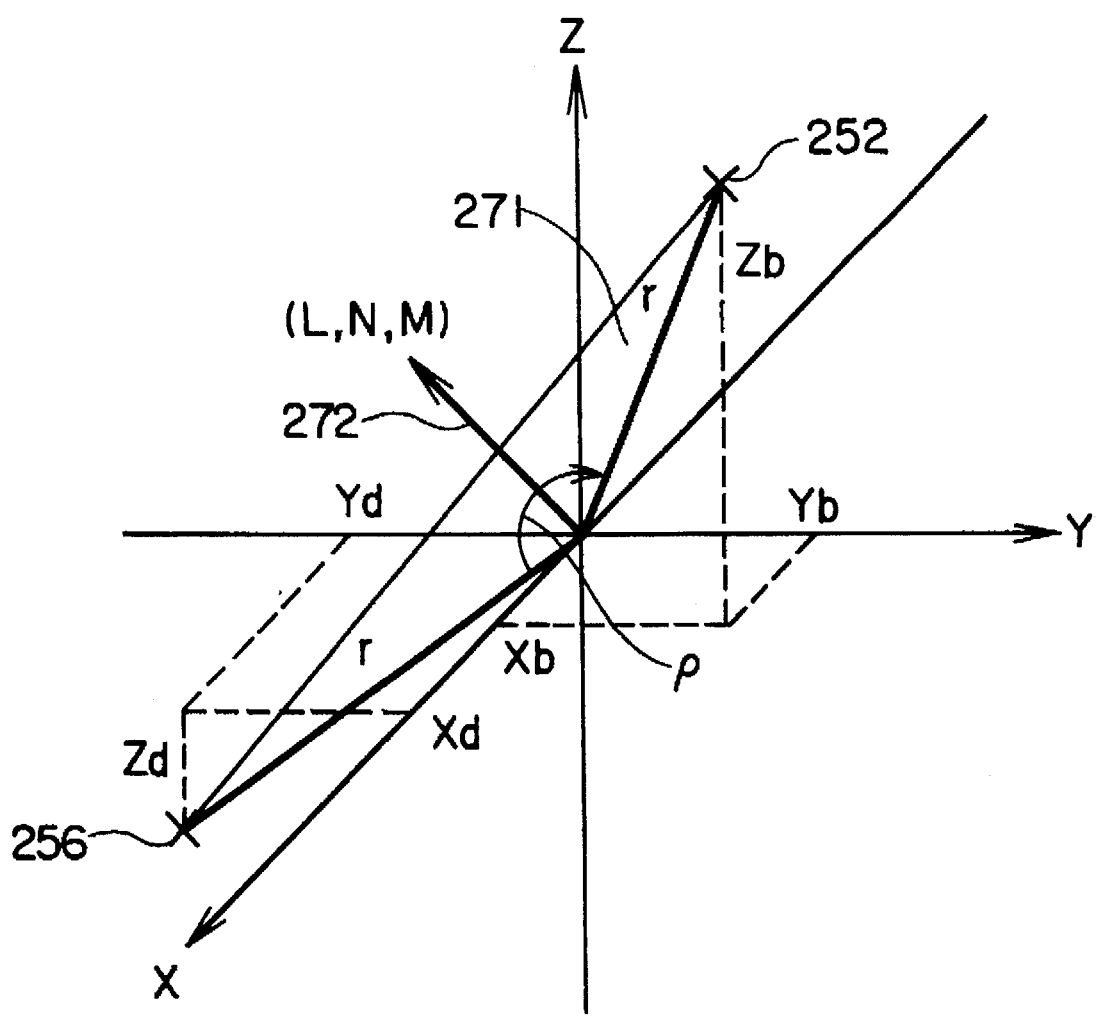
FIG. 15 is a diagram used to explain the rotational angle generation means.

In FIG. 15, indicated by 256 is three-dimensional base coordinates (Xb, Yb, Zb), 252 is three-dimensional target coordinates (Xb, Yb, Zb), and 271 is a plane formed by the origin, base coordinates and target coordinates, and 272 is a vector which is normal to the plane and is the axis of rotation for the object image. In this embodiment, a unit vector (L, M, N) of the rotation axis is evaluated.

The equation of the plane 271 is given as the solution of the following linear simultaneous equations.

$lX + mY + nZ = 0$ $lXd + mYd + nZd = 0$ $$lXb + mYb + nZb = 0$$

where l, m and n represent the directional ratio of the plane 271.

The equation is solved as follows.

$$X(YdZb - YbZd) + Y(ZdXb - ZbXd) + Z(XdYb - XbYd) = 0$$

Accordingly, the unit vector (L, M, N) of the rotation axis 272 is obtained as follows.

$$L = (YdZb - YbZd)/H$$

$$M = (ZdXb - ZbXb)/H$$

$$N = (XdYb - XbYd)/H \qquad (11)$$

where $$H = \sqrt{\{(YdZb - YbZd)^2 + (ZdXb - ZbXd)^2 + (XdYb - YbYd)^2\}} \qquad (12)$$

Finally, the matrix generation means 245 generates a new rotation transformation matrix 236 using the unit vector (L, M, N). The operational procedure is as follows for example.

First, the image is rotated around the x and y axes so that the rotation axis becomes coincident with the z axis. Namely, the image is rotated around the x axis in accordance with the following transformation matrix Rx until the rotation axis lies on the xz plane.

$$Rx = \begin{pmatrix} 1 & 0 & 0 \\ 0 & N/S & -M/S \\ 0 & M/S & N/S \end{pmatrix} \qquad (13)$$

where $$S = \sqrt{(M^2 + N^2)} \qquad (14)$$

The rotational direction is defined to be positive when the positive y axis direction turns to the positive z axis direction. The image is further rotated around the y axis in accordance with the following transformation matrix Ry until the rotation axis becomes coincident with the z axis.

$$Ry = \begin{pmatrix} S & 0 & L \\ 0 & 1 & 0 \\ -L & 0 & S \end{pmatrix} \qquad (15)$$

The rotational direction is defined to be positive when the positive x axis direction turns to the positive z axis direction. In this state, the rotation axis is coincident with the z axis, and the image is rotated around the z axis.

Next, the image is rotated around the z axis in accordance with the following transformation matrix Rz.

$$Rz = \begin{pmatrix} \cos\rho & \sin\rho & 0 \\ -\sin\rho & \cos\rho & 0 \\ 0 & 0 & 1 \end{pmatrix} \qquad (16)$$

The rotational direction is defined to be positive when the positive x axis direction turns to the positive y axis direction. The rotation axis $\rho$ is calculated as follows.

$$\rho = \rho_2 - \rho_1$$

where $\rho_1 = \tan^{-1}(Y_1/X_1)$
$\rho_2 = \tan^{-1}(Y_2/X_2)$ $\{X_1, Y_1, Z_1\} = \{Xd, Yd, Zd\}RxRy$
$\{X_2, Y_2, Z_2\} = \{Xb, Yb, Zb\}RxRy$
$\tan^{-1}(y/x)$ is identical to that defined by the expression (6).

Finally, the inverse transformation against the rotation around the x and y axes is implemented, and the coordinates as a result of image rotation is obtained. The rotation transformation matrix R is produced as follows.

$$R = RxRyRzRy^{-1}Rx^{-1} \qquad (17)$$

where $Rx^{-1}$ and $Ry^{-1}$ are the inverse matrixes of the transformation matrixes Rx and Ry.

By carrying out the foregoing rotation and projection processes in the same manner as the sixth embodiment for the original object image data by use of the newly generated rotation transformation matrix R, the three-dimensional object image can be displayed by being rotated to the intended position.

In this embodiment, if all of the origin, three-dimensional base coordinates and two-dimensional target coordinates are located on the same line, the plane 271 cannot be defined uniquely. In this case, the base coordinates or target coordinates are moved slightly within the practical tolerance, or alternatively a proper plane among those including the three-dimensional base coordinates and target coordinates is specified.

Next, the eighth embodiment of this invention will be explained. Although the sixth embodiment is designed to rotate the object image from a position of the object before the rotation which was carried out when the object image was displayed initially to a target position, another possible method is to rotate the object image from a position of the object after the rotation which was carried out when the object image was displayed initially to a target position. In this case, the rotation transformation matrix generation means 235 generates a rotation transformation matrix in accordance with the operational procedure shown in FIG. 16. In the figure, the rotation axis generation means 242 and matrix generation means 243 are completely identical to those of the sixth embodiment. A rotation transformation matrix storage means 246 is used to store the rotation transformation matrix of the present time point. A matrix multiplication means 247 performs multiplication between the rotation transformation matrix generated by the matrix generation means 243 and the rotation transformation matrix stored in the rotation transformation matrix storage means 246.

Figure 16:
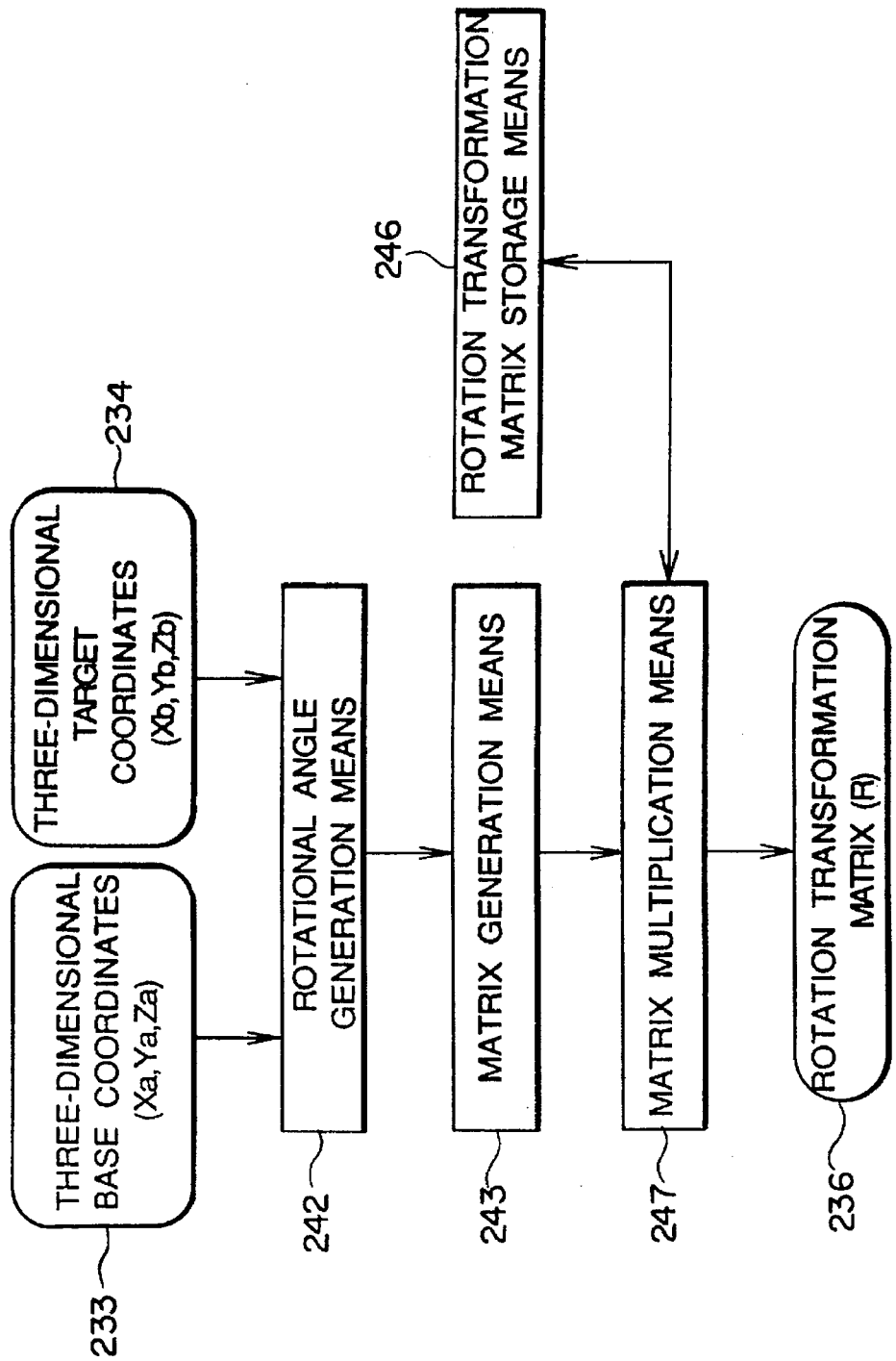
FIG. 16 is a flowchart explaining the rotation transformation matrix generation means based on the eighth embodiment.

The procedure of generating a rotation transformation matrix will be explained on FIG. 16.

First, the rotation axis generation means 242 calculates the rotational angles $\theta$ and $\phi$ around the z and y axes, respectively. The calculation process may be completely identical to that of the sixth embodiment. In this case, coordinate transformation by the inverse coordinate transformation means 241 is not needed and the three-dimensional base coordinates (Xd, Yd, Zd) in the sixth embodiment are dealt with as (Xa, Ya, Za).

Next, the matrix generation means 243 produces a rotation transformation matrix $R_0$ from the resulting rotational angles $\theta$ and $\phi$ in accordance with the expression (1).

Finally, the matrix multiplication means 247 implements the following operation to produce the final rotation transformation matrix R.

$$R = R_1 \cdot R_0 \qquad (18)$$

where $R_1$ is the rotation transformation matrix of the present time point stored in the rotation transformation matrix storage means 246. The resulting rotation transformation matrix R is stored in the rotation transformation matrix storage means 246 so that it is used for the next matrix generation.

By carrying out the foregoing rotation and projection processes in the same manner as the sixth embodiment for the original object image data by use of the newly generated rotation transformation matrix R, the three-dimensional object image can be displayed by being rotated to the intended position.

Next, the ninth embodiment of this invention will be explained.

The seventh embodiment can be modified to rotate the object image from a position of the object after the rotation which was carried out when the object image was displayed initially to a target position, as of the case of the eighth embodiment. In this case, the rotation transformation matrix generation means 235 generates a rotation transformation matrix in accordance with the operational procedure shown in FIG. 17.

In the figure, the rotation axis generation means 244 and matrix generation means 245 are completely identical to those of the seventh embodiment, and the rotation transformation matrix storage means 246 and matrix multiplication means 247 are completely identical to those of the eighth embodiment.

Figure 17:
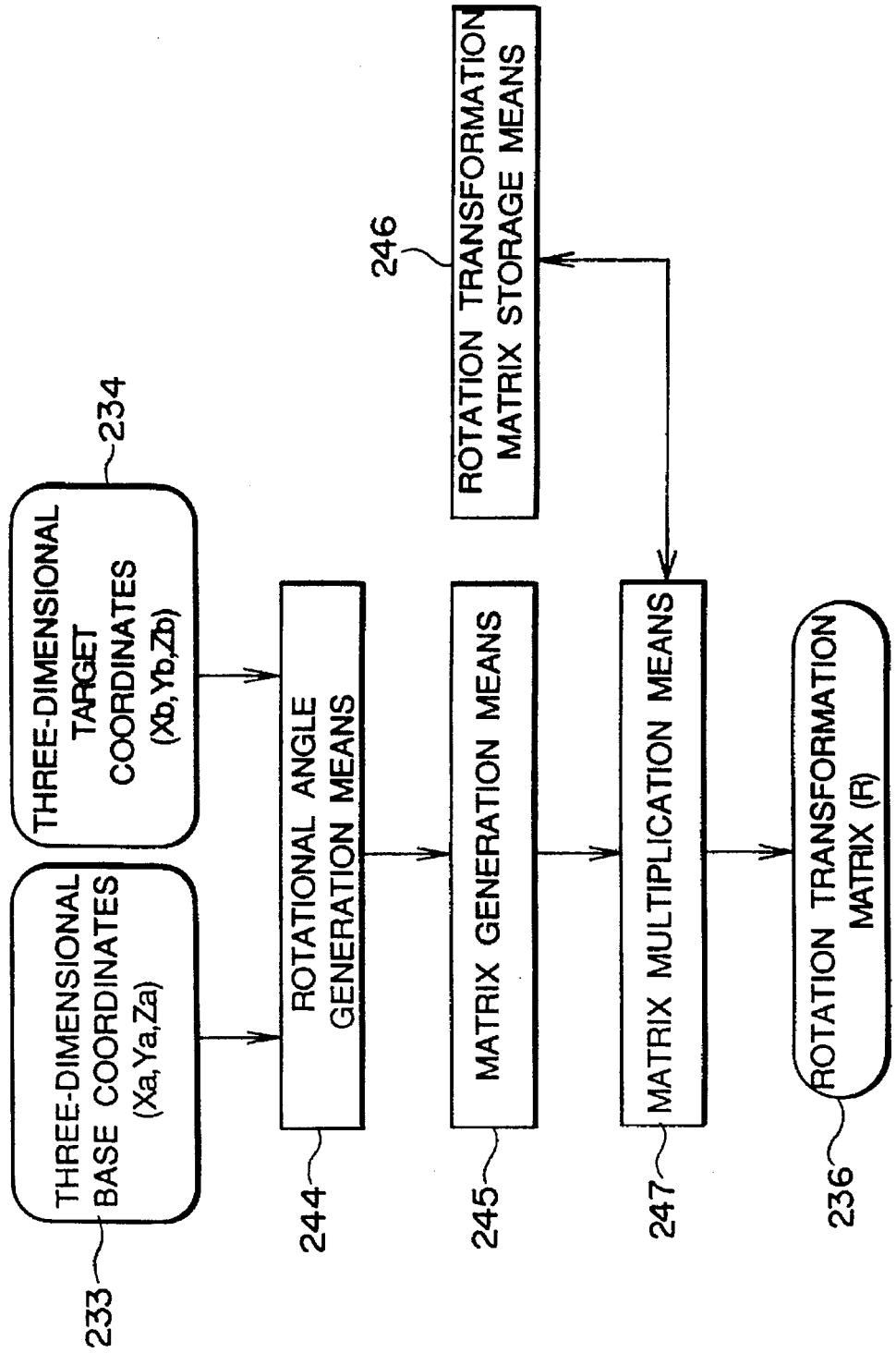
FIG. 17 is a flowchart explaining the rotation transformation matrix generation means based on the ninth embodiment.

The procedure of generating a rotation transformation matrix will be explained in reference to FIG. 17.

First, the rotation axis generation means 244 calculates the unit vector (L, M, N) of the rotation axis. This process may be completely identical to that of the seventh embodiment. In this case, coordinate transformation by the inverse coordinate transformation means 241 is not needed and the three-dimensional base coordinates (Xd, Yd, Zd) in the seventh embodiment are dealt with as (Xa, Ya, Za).

Next, the matrix generation means 245 produces a rotation transformation matrix R0 from the resulting unit vector (L, M, N) in accordance with the expression (17).

Finally, the matrix multiplication means 247 implements the following operation of expression (18) to produce the final rotation transformation matrix R. The resulting rotation transformation matrix R is stored in the rotation transformation matrix storage means 246 so that it is used for the next matrix generation.

By carrying out the foregoing rotation and projection processes in the same manner as the sixth embodiment for the original object image data by use of the newly generated rotation transformation matrix R, the three-dimensional object image can be displayed by being rotated to the intended position.

According to the image manipulation method based on this invention, when the operator enters base coordinates which are the reference of operation and target coordinates while viewing the displayed object image, a rotation transformation matrix, which rotates the object image such that the portion located at the position of base coordinates is moved to the position of target coordinates, is produced from the base and target coordinates. This enables the operator to rotate the object image by making direct access to the object image which is already displayed, and accomplishes a sophisticated user interface which allows the user to rotate the object image with the feeling similar to rotating the actual object in the real space.

Although the foregoing four embodiments are designed to enter a pair of coordinates, i.e., the base coordinates and target coordinates, and display the image portion, which has been located at the base coordinates, at the position of target coordinates, it is also possible to enter the base coordinates and thereafter enter target coordinates successively so that the object image is rotated in steps such that the portion located at the position of base coordinates is moved to the positions of target coordinates successively.

Figure 18:
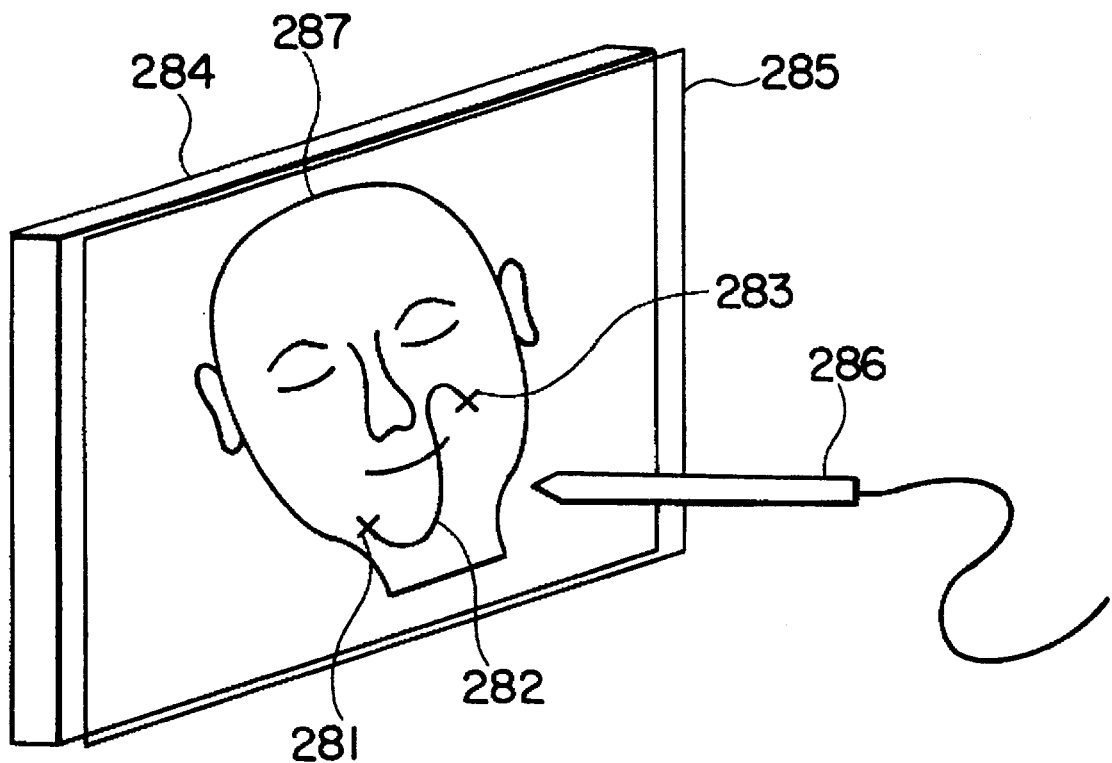
FIG. 18 is a diagram used to explain, as an example, the image manipulation method based on this invention.

For example, a display and coordinate input means 284 which is an integrated device made up of a display panel 284 and transparent tablet 285 is used to display a head 287 as shown in FIG. 18. The transparent tablet 285 and an associated pen 286 operate in unison to evaluate the coordinates of the position of the pen point in response to the contact of the pen point to the screen or the movement of the pen point which is in contact with the screen.

Figure 19:
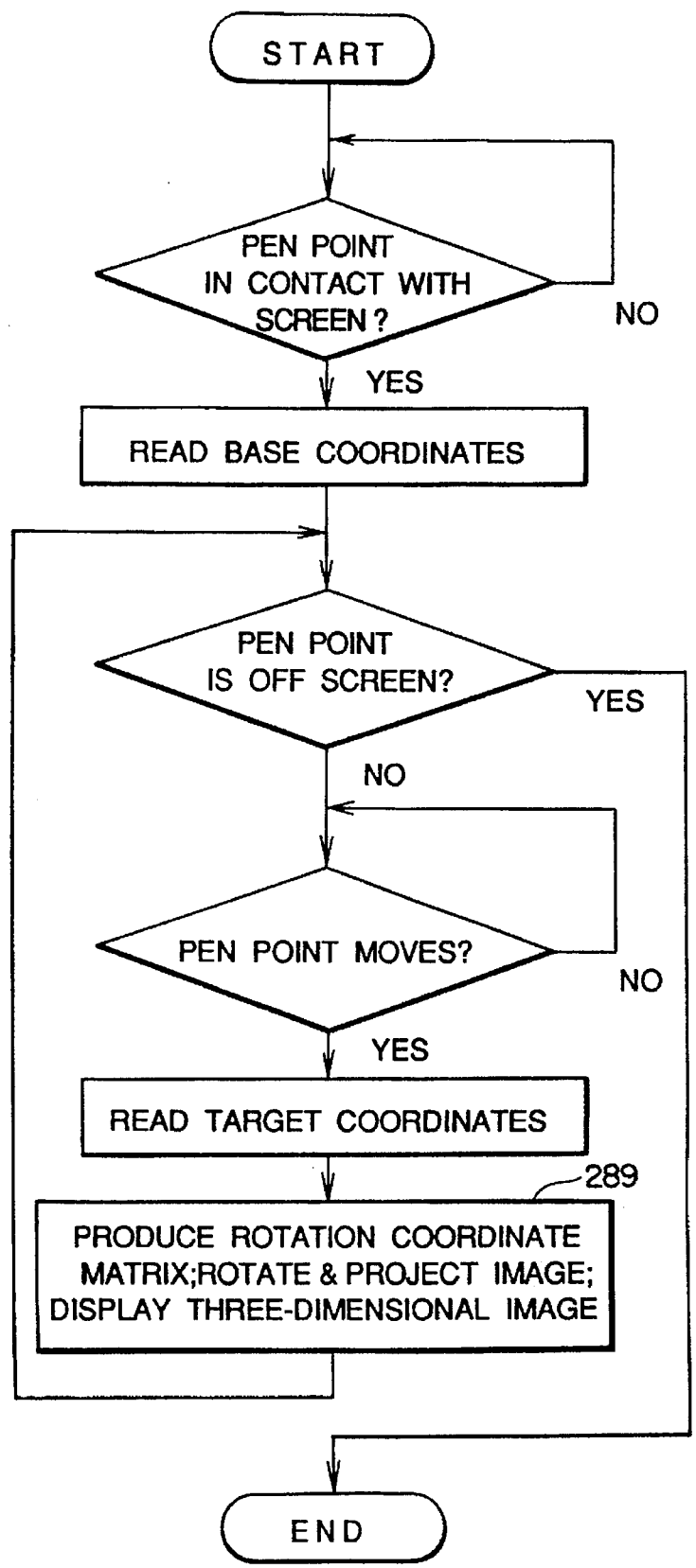
FIG. 19 is a flowchart explaining, as an example, the operation of successive image rotation.

Three-dimensional images of the head are displayed successively in accordance with the procedure shown in FIG. 19 for example. A step 289 is to display a three-dimensional image resulting from the generation of a rotation transformation matrix and the rotation and projection processes based on the base and target coordinates picked up with the pen, and the procedure of this step is the same as explained previously. The image rotating operation takes place as follows. When the operator brings the pen point 286 in contact with a position 281 for example in FIG. 18, the coordinates of this position are recognized to be the base coordinates. Subsequently, when the operator moves the pen point along a curve 282, with the pen point being kept in contact with the screen, the head image 287 rotates by following the trace of the pen point, and the image rotation stops when the pen point is taken off the screen.

In this manner, the image processing method based on this invention is capable of rotating the object image successively such that the portion located at the position of base coordinates is moved in steps to the positions of target coordinates. This enables the operator to determine the amount of rotation while viewing the three-dimensional object image which is produced in response to the command entry.

In addition, the method is capable of rotating a displayed object image by allowing the operator to make direct access to the screen section where the image is displayed, and this enables the operator to take actions while watching on the object image.

Moreover, the foregoing four embodiments can be modified to have a function of cancelling the image rotating operation which has been done through means for storing the rotation transformation matrixes used in the past.

Figure 20:
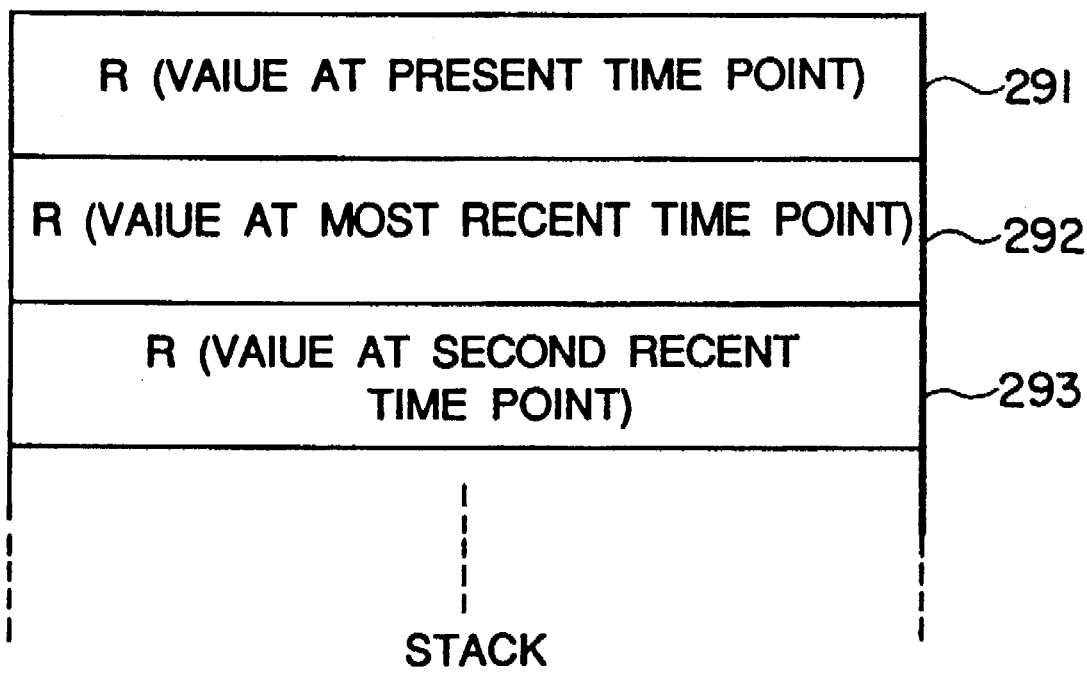
FIG. 20 is a diagram used to explain an example of a means of storing old rotation transformation matrixes.

For example, the rotation transformation matrix which is used when the head portion is moved from the position 281 to the position 283 in FIG. 18 is stored in a stack register as shown in FIG. 20. A rotation transformation matrix 291 stored at the top of the stack is the one used to produce the image displayed currently, and matrixes 292 and 293 stored in the second and third stages are those used in the most recent operation and second most recent operation.

In response to the operator's command of cancellation, the previous rotation transformation matrix 292 is taken out of the stack and used to display again the three-dimensional object image which immediately precedes the current display.

Although the foregoing four embodiments deal with a single object, i.e., a head, to be displayed, it is also possible to rotate all displayed objects as the whole by defining the rotation transformation matrix to cover all of the objects. Alternatively, the rotation transformation matrix may be defined only to an object located at the position of base coordinates so that only that object is rotated.

Although in the foregoing four embodiments, the mode of rotation (rotation axis and rotational angle) is determined from the base and target coordinates, the conventional manner may be used together or in addition. For example, a new rotation axis (e.g., x, y or z axis) is specified or the rotational angle is specified numerically for the rotation of the object image. Alternatively, since a three-dimensional image displayed on the screen is actually a two-dimensional image, additional means may be provided for rotating the image around the origin of the display plane.

Furthermore, if it is difficult for the rotational display operation of the head image 287 to follow the movement of the pen point 286 (the movement shown by 282 for example) due to a shortage of processing time or the like, the pen movement may be followed by a sequential display of characters, symbols or a figure which at least indicates the rotation of the image. Examples of the formation of the characters, symbols or figure include a solid body indicative of the profile of the object or a three-dimensional wire-frame model indicative of the brief view of the object. The substitutive image is rotated in accordance with the rotation transformation matrixes produced successively in response to the movement of the pen point, and during this operation the three-dimensional projected image may be kept quiescent or may be erased on the screen.

Another device used in the image manipulation is means for detecting that the pen point is taken off the screen or it is not moved for a certain time length. The output of this detecting device is used to trigger the generation of a rotation transformation matrix so as to calculate the image as a result of the rotation. The target coordinates of the rotation are the coordinates of the position at which the pen point is taken off the screen or the movement of the pen point is stopped.

Although the foregoing four embodiments have been explained mainly for the case in which a three-dimensional object image is created and displayed based on the three-dimensional original image data which includes information on the location and shape of the object necessary for the display operation, by volume rendering using such as voxel data, the present invention is also applicable to the case in which volume data is searched through the scanning of the sight and a three-dimensional image is created and displayed. In this case the direction vector of the sight is rotated by the rotation transformation means, instead of rotating the object image. Accordingly, the inverse matrix of the rotation transformation matrix is used for the rotating process, instead of the rotation transformation matrix itself.

As described above, according to the image manipulation method based on this invention, when the operator enters base coordinates which are the reference of operation and target coordinates while viewing the displayed object image, a rotation transformation matrix, which rotates the object image such that the portion located at the position of base coordinates is moved to the position of target coordinates, is produced from the base and target coordinates. This enables the operator to rotate the object image by making direct access to the object image which is already displayed, and accomplishes a sophisticated user interface which allows the user to rotate the object image with the feeling similar to rotating the actual object in the real space. In addition, the inventive image processing method is designed to rotate the object image successively such that the portion located at the position of base coordinates is moved to the positions of target coordinates in steps in response to the successive entries of target coordinates. Consequently, the operator can determine a proper amount of rotation while viewing the three-dimensional object image produced in response to the command input. Moreover, the method is designed to rotate the object image by allowing the operator to make direct access to the screen section where the object image is displayed.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. An arbitrary viewpoint three-dimensional imaging method using compressed voxel data constructed by a directed search of voxel data representing an image of an object, said method comprising the steps of:

(a) searching at least six neighboring voxel data positions around each of all voxel data inside of said object represented by the voxel data along each of six axes directions in a space defined by three coordinate axes intersecting at right angles with each other to detect boundary voxel positions representing surface positions of said object in each of the six axes directions, the image of said object being represented in the three coordinate axes;

(b) producing eight kinds of compressed boundary coordinate data representing boundary voxel positions from eight viewpoint positions in the three coordinate axes having different voxel connectivity from the neighboring voxels;

(c) storing, in a memory, the compressed boundary coordinate data from the eight viewpoint positions for each difference of voxel connectivity in the three coordinate axes;

(d) selecting one kind of the compressed boundary coordinate data from the memory based on positive or negative signs of three coordinate axes components of a vector which is normal to a display plane and points from the display plane to the object;

(e) transforming the boundary voxel positions expressed by the selected compressed boundary coordinate data into coordinate values on the display plane and distances therefrom to the display plane;

(f) producing, from the transformed boundary voxel positions, range data representing the distances from the display plane to the boundary voxel positions based on the viewpoint position using a Z-buffer;

(g) shading a surface of said object based on said range data; and (h) displaying a three-dimensional image of said object based on the shaded surface.

* * * * *